(12) United States Patent
Samaras et al.

(10) Patent No.: US 7,206,326 B2
(45) Date of Patent: Apr. 17, 2007

(54) UNEQUAL ERROR PROTECTION FOR PACKET SWITCHED NETWORKS

(75) Inventors: Konstantinos Samaras, Swindon (GB); Jian Jun Wu, Reading (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/980,288

(22) PCT Filed: Apr. 20, 2000

(86) PCT No.: PCT/GB00/01561

§ 371 (c)(1),
(2), (4) Date: Mar. 12, 2002

(87) PCT Pub. No.: WO00/76112

PCT Pub. Date: Dec. 14, 2000

(65) Prior Publication Data

US 2004/0233903 A1    Nov. 25, 2004

(30) Foreign Application Priority Data

Jun. 9, 1999    (EP) .................................. 99304485

(51) Int. Cl.
*H04J 1/00* (2006.01)
*H04J 3/00* (2006.01)
*H04B 1/66* (2006.01)

(52) U.S. Cl. ...................... 370/487; 370/493; 370/529; 375/240.27

(58) Field of Classification Search ................ 370/487, 370/493, 535–544, 474, 529; 375/240.24, 375/240.27
See application file for complete search history.

(56) References Cited

U.S. PATENT DOCUMENTS

| | | | |
|---|---|---|---|
| 5,432,778 A | | 7/1995 | Minde |
| 5,729,526 A | * | 3/1998 | Yoshida ..................... 370/206 |
| 5,815,507 A | | 9/1998 | Vinggaard |
| 5,867,209 A | | 2/1999 | Irie et al. |
| 6,256,487 B1 | * | 7/2001 | Bruhn ........................ 455/352 |
| 6,405,338 B1 | * | 6/2002 | Sinha et al. ................ 714/752 |
| 6,987,813 B1 | * | 1/2006 | Demetrescu et al. ........ 375/295 |

OTHER PUBLICATIONS

Van Nobelen, R. et al; "An adaptive radio link protocol with enhanced data rates for GSM evolution"; Personal Communications, IEEE [see also IEEE Wireless Communications] vol. 6, Issue 1, Feb. 1999 pp. 54-64.*

* cited by examiner

*Primary Examiner*—Chi Pham
*Assistant Examiner*—Tri H. Phan

(57) ABSTRACT

A method of encoding at least two sets of data bits into a single encoded block is provided, wherein each set of data bits includes a primary set of bits to be encoded and a secondary set of bits to remain unencoded, wherein the encoding technique requires a set of code terminating bits to be added to the primary set of bits; the method comprising: combining the two sets of primary bits, whereby one set of code terminating bits is added to the combined two sets of primary bits. The two sets of data bits may each include a header portion and a payload portion, the payload portion comprising encoded speech. The encoding step may be a channel encoding step for encoding the at least two sets of data bits for transmission on a packet switched network. The data bits may be for transmission on an EDGE packet switched network, wherein the at least two sets of data bits are encoded into a single RLC/MAC block.

5 Claims, 23 Drawing Sheets

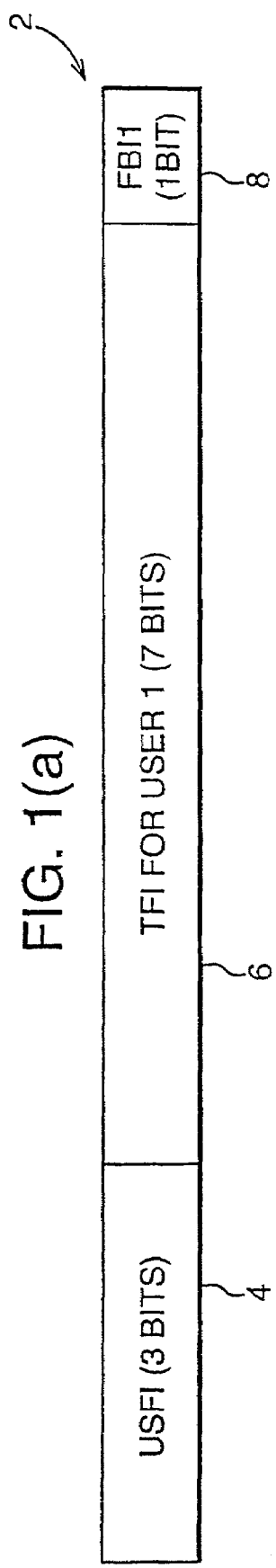
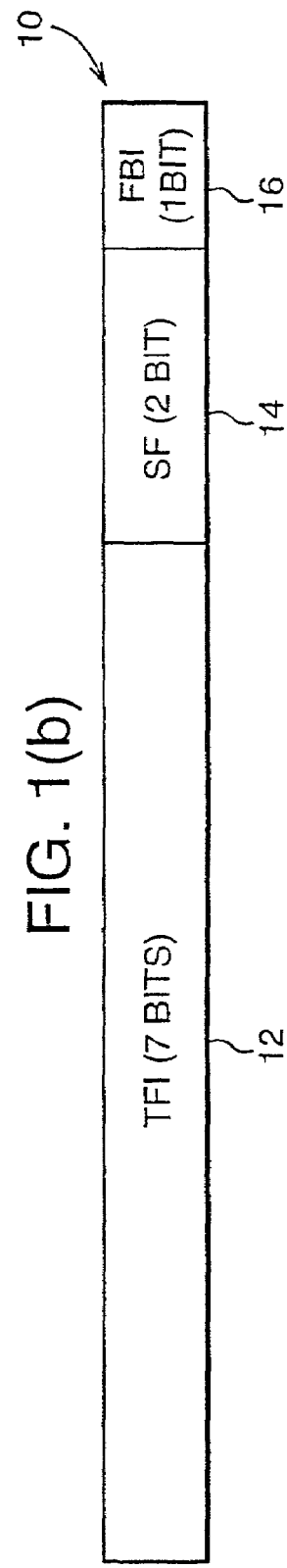
FIG. 1(a)
FIG. 1(b)

FIG. 4(a)

| C/I (dB) | DROPPED HEADERS WITHOUT ERROR DETECTION | DROPPED HEADERS WITH ERROR DETECTION | IMPROVEMENT (%) |
|---|---|---|---|
| 6 | 1429 | 1281 | 10.36 |
| 7 | 1028 | 884 | 14.01 |
| 8 | 700 | 591 | 15.57 |
| 9 | 454 | 401 | 11.67 |
| 10 | 278 | 243 | 12.59 |
| 11 | 180 | 140 | 22.22 |
| 12 | 101 | 87 | 13.86 |
| 13 | 59 | 47 | 20.34 |

FIG. 4(b)

| C/I (dB) | DROPPED HEADERS WITHOUT ERROR DETECTION | DROPPED HEADERS WITH ERROR DETECTION | IMPROVEMENT (%) |
|---|---|---|---|
| 6 | 1453 | 1258 | 13.42 |
| 7 | 1087 | 930 | 14.44 |
| 8 | 715 | 608 | 14.96 |
| 9 | 498 | 402 | 19.27 |
| 10 | 285 | 230 | 19.29 |
| 11 | 199 | 157 | 21.10 |
| 12 | 98 | 74 | 24.49 |
| 13 | 49 | 39 | 20.41 |

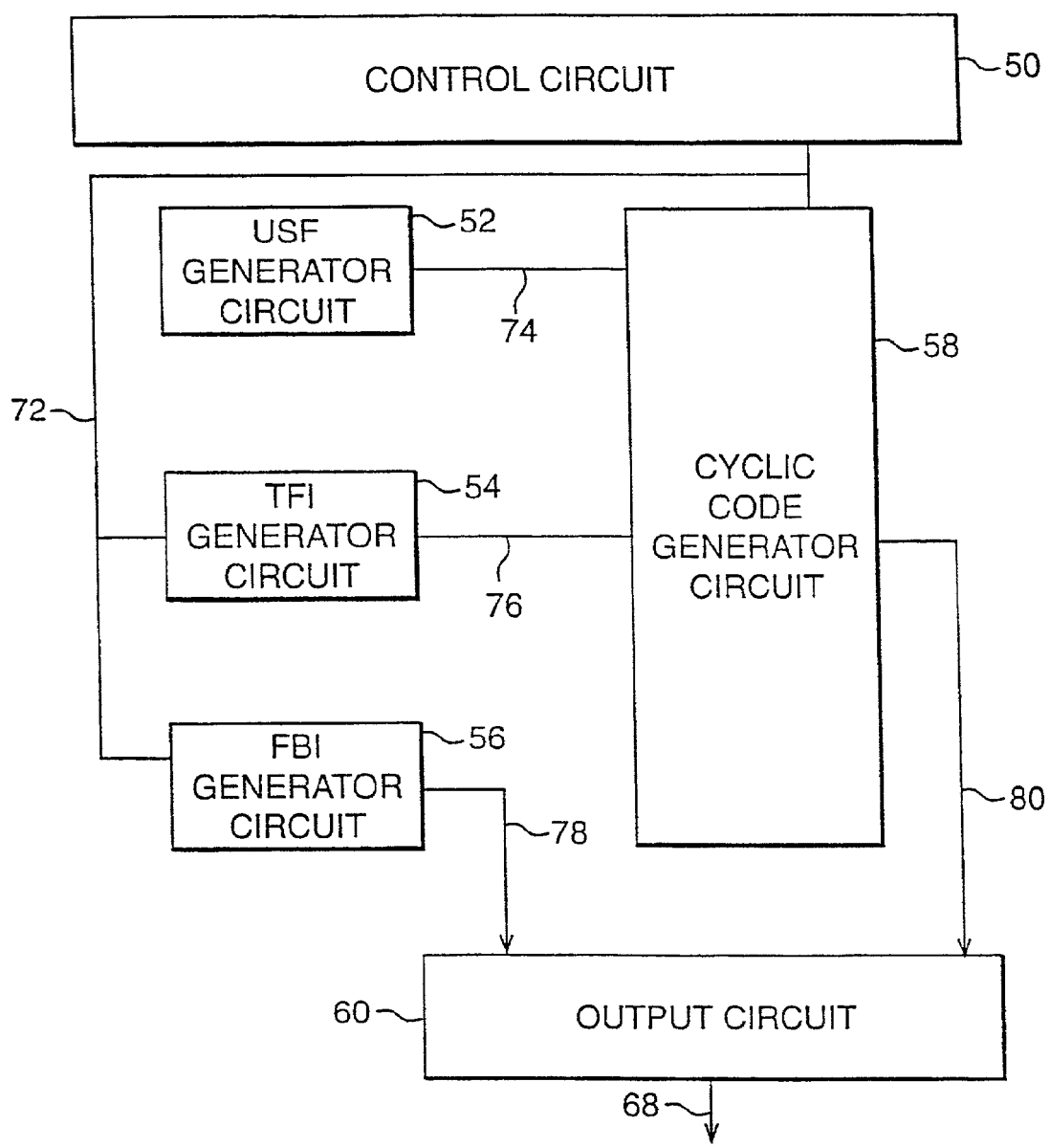
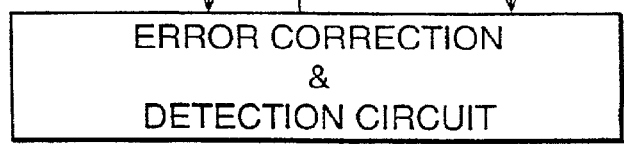

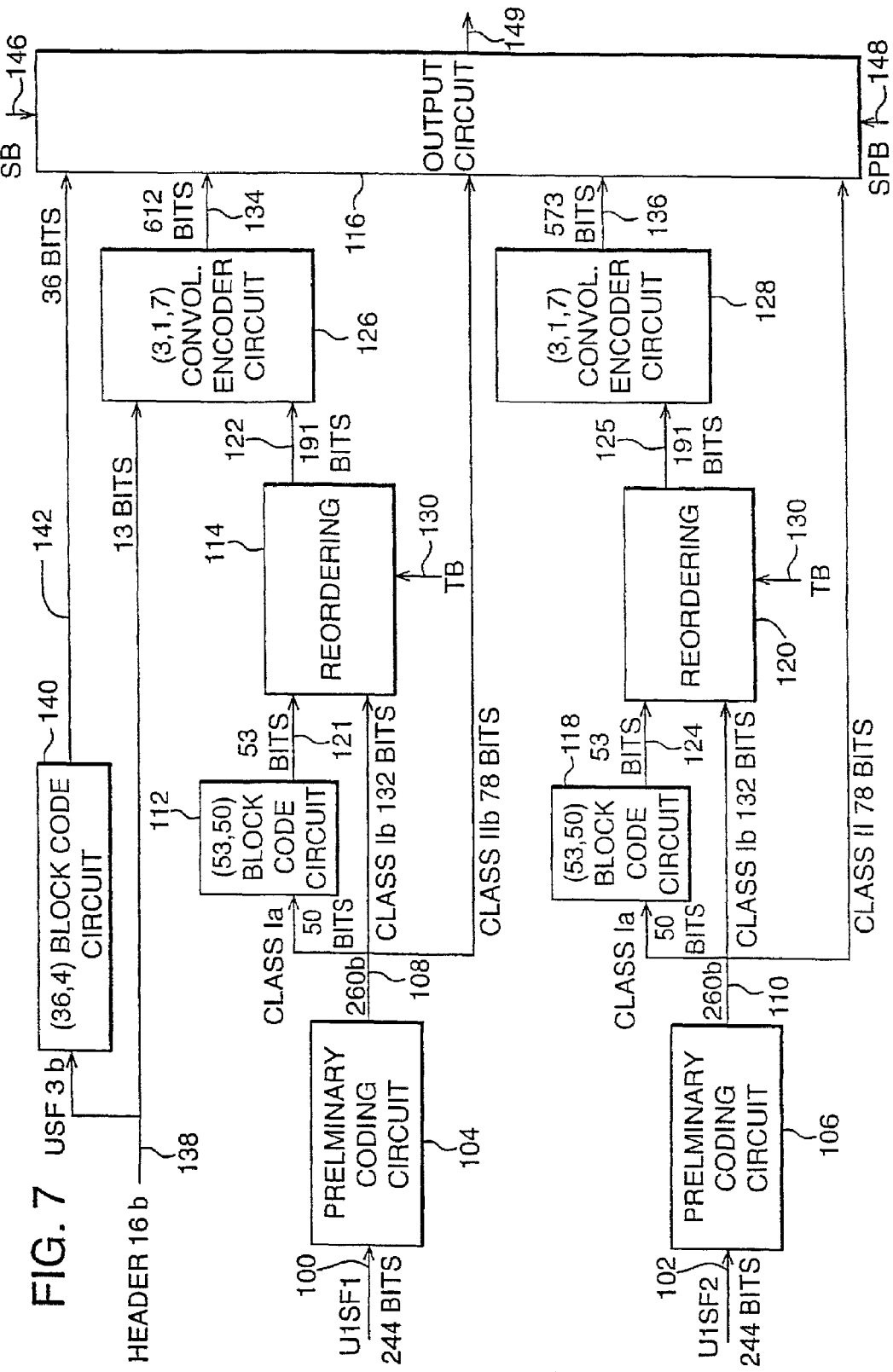

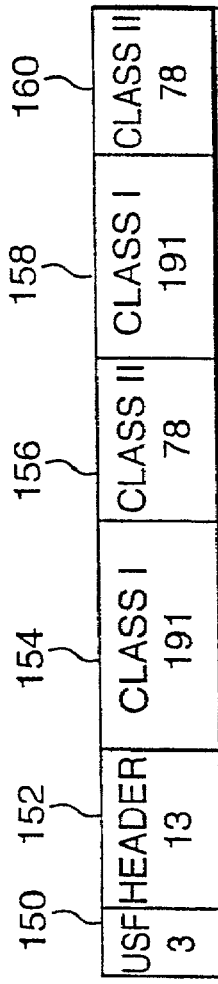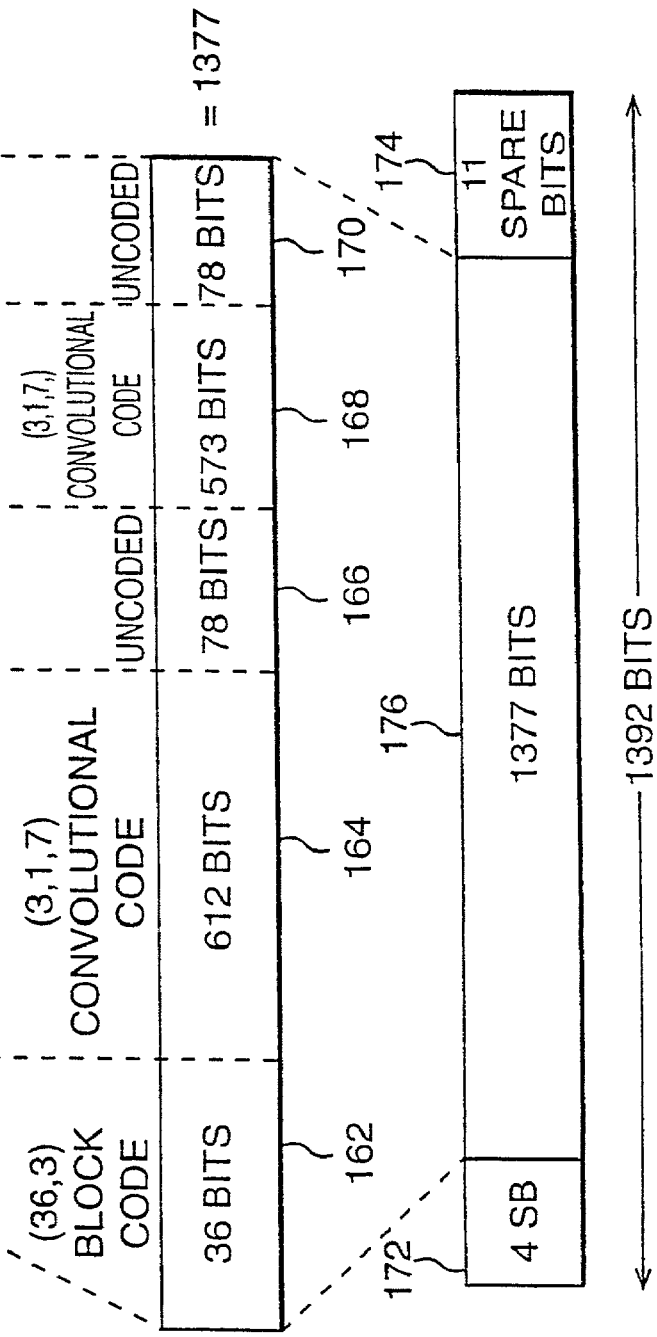
FIG. 8(a)
FIG. 8(b)
FIG. 8(c)

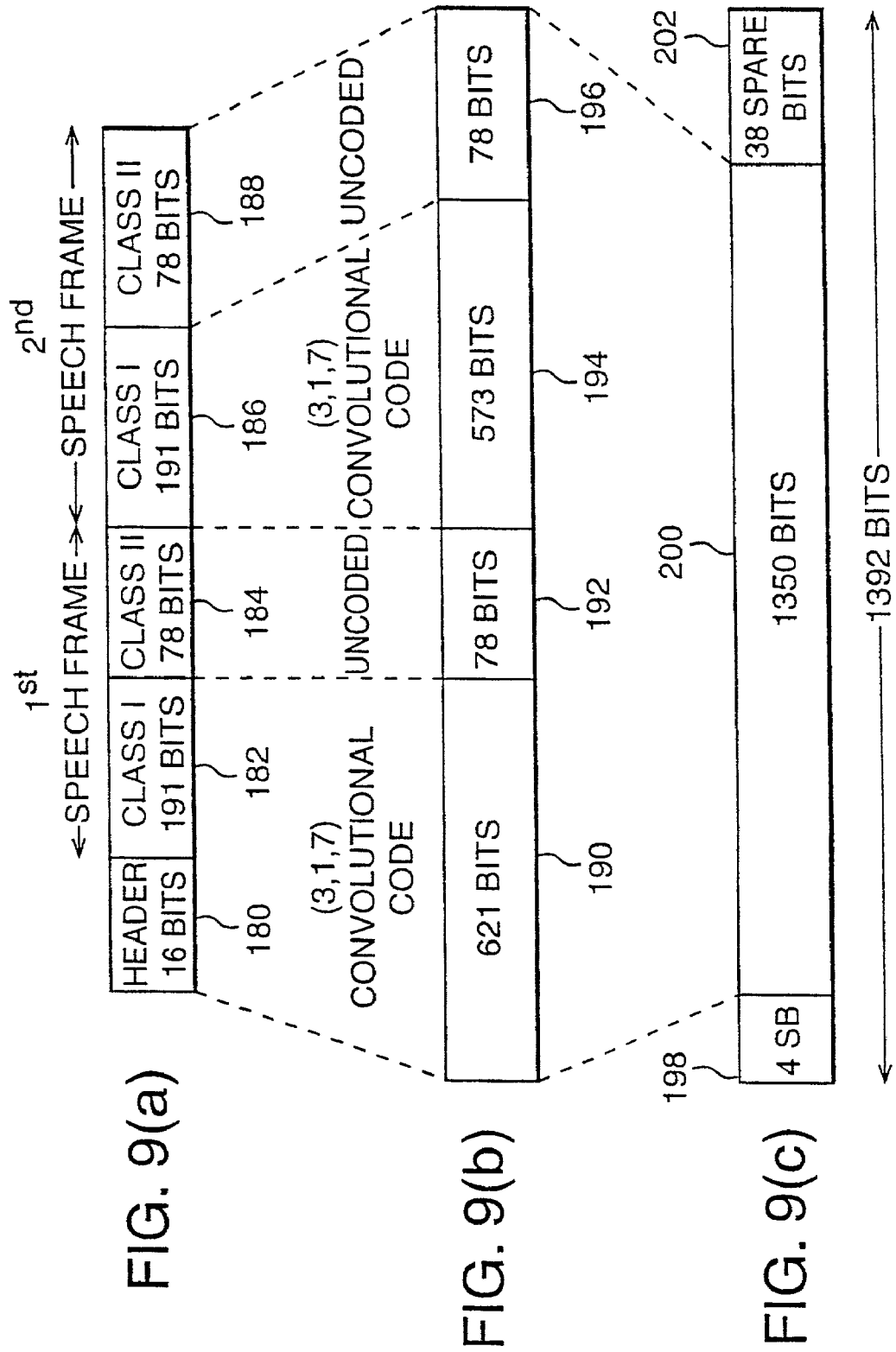

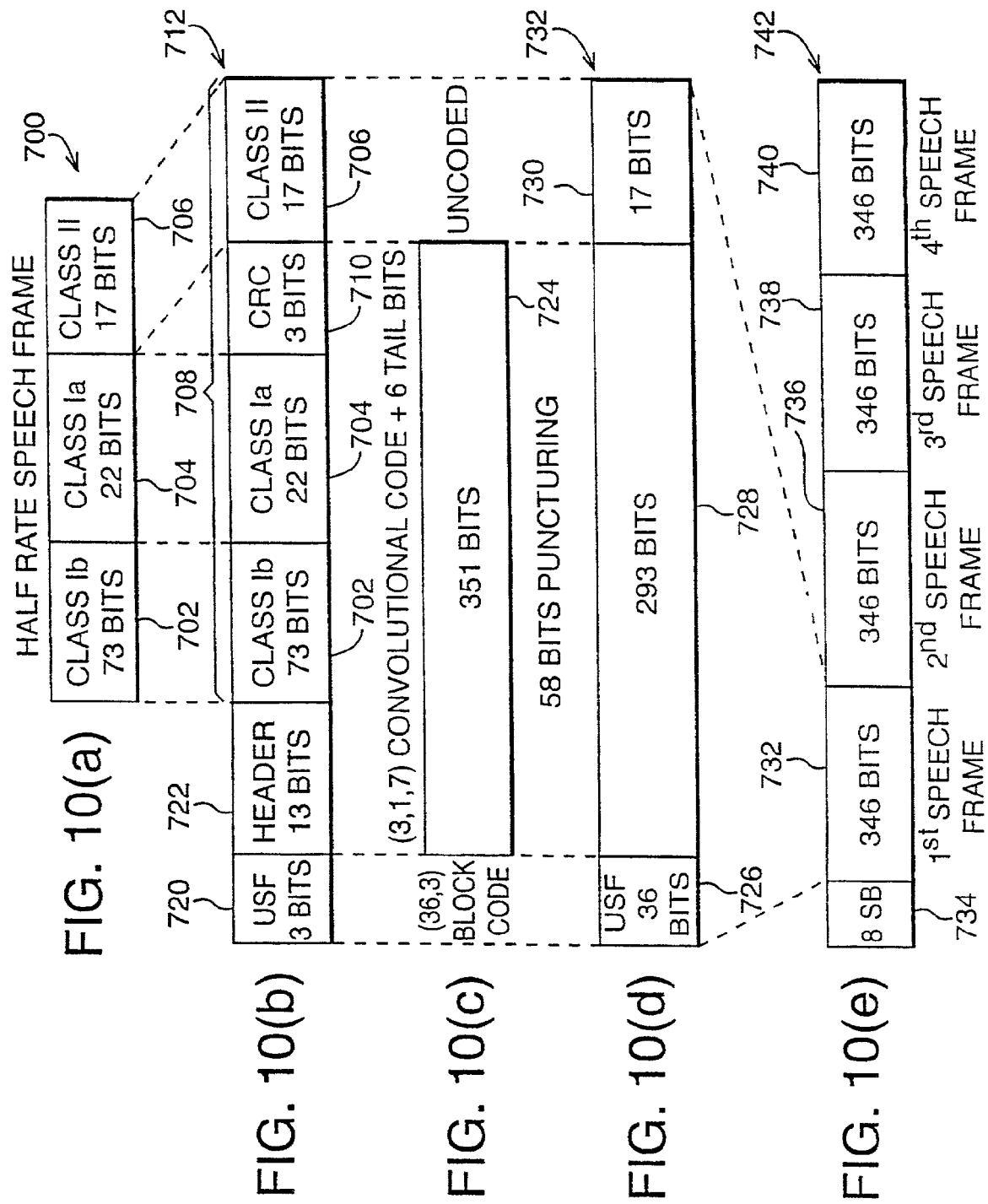

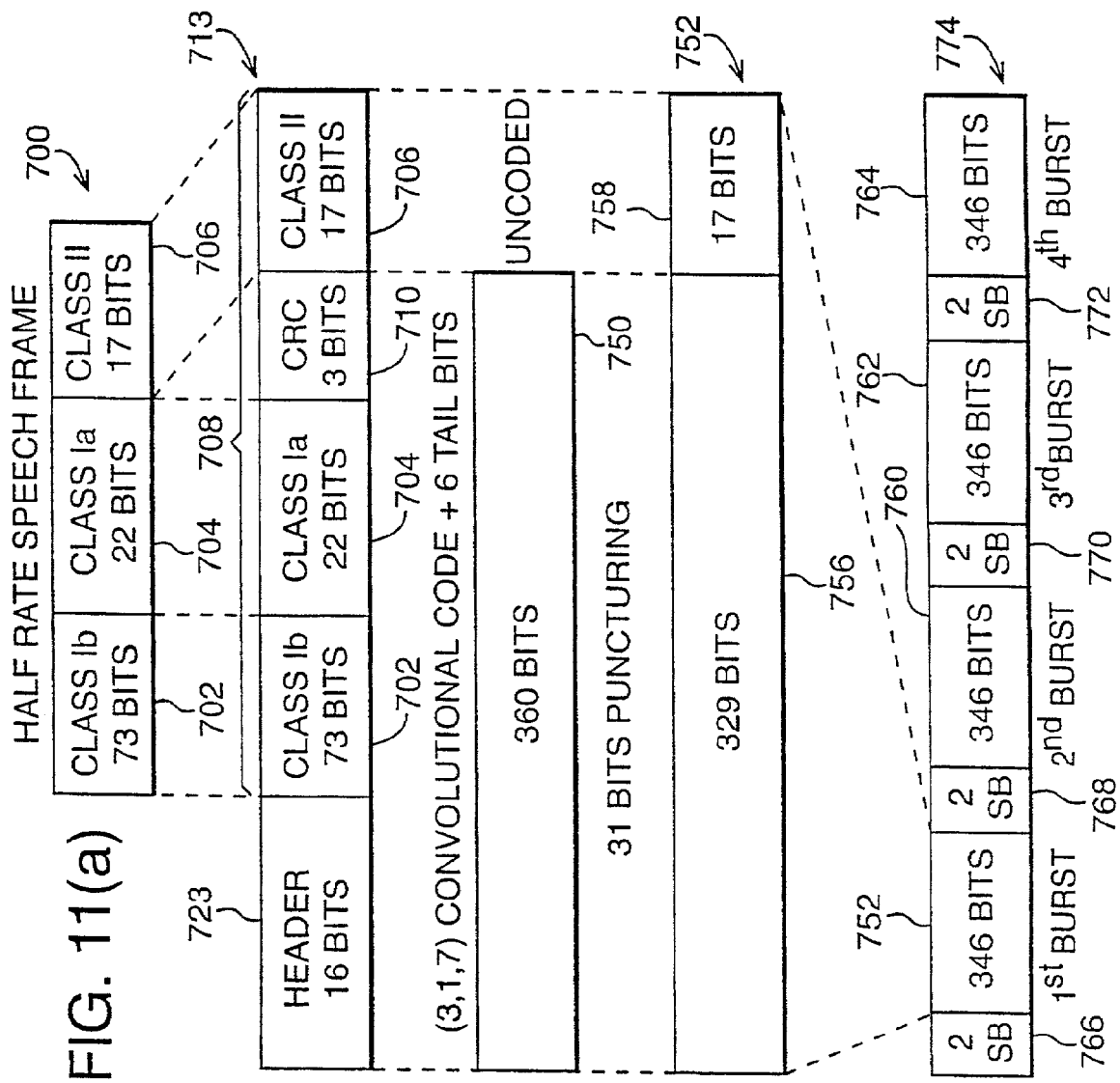

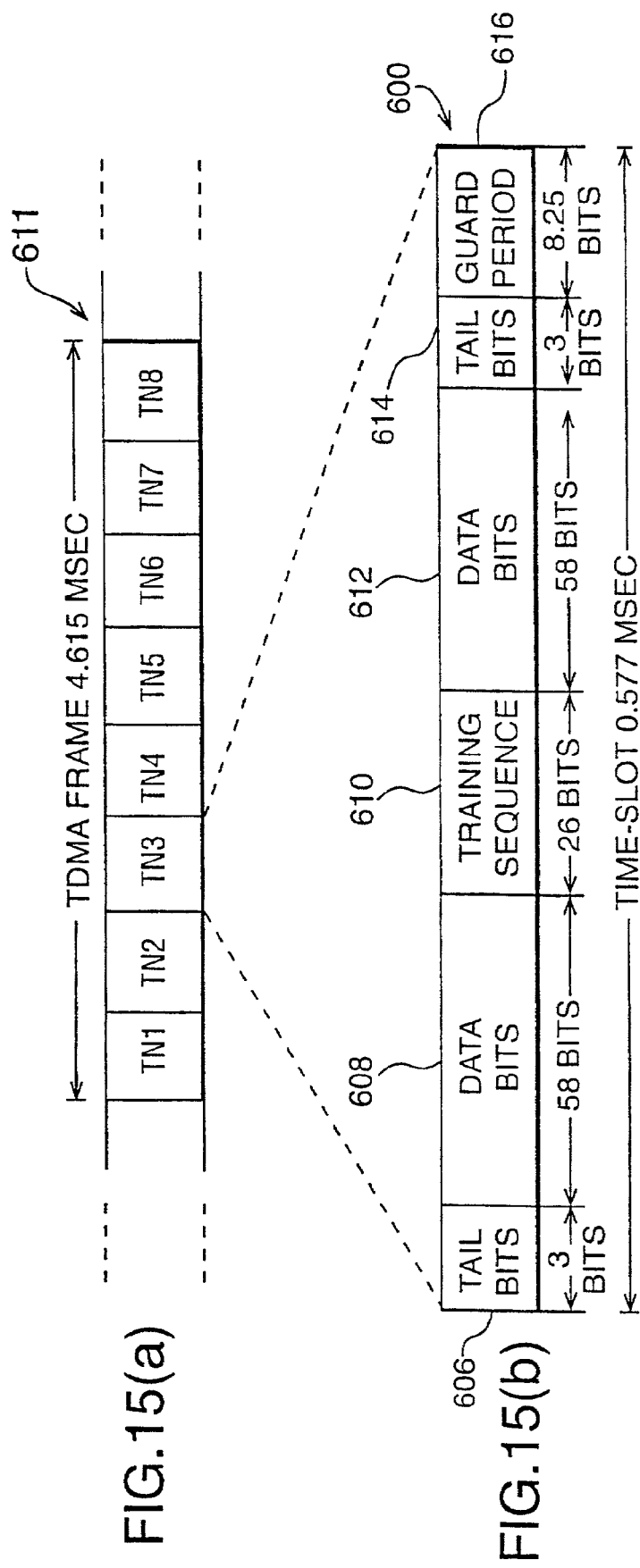

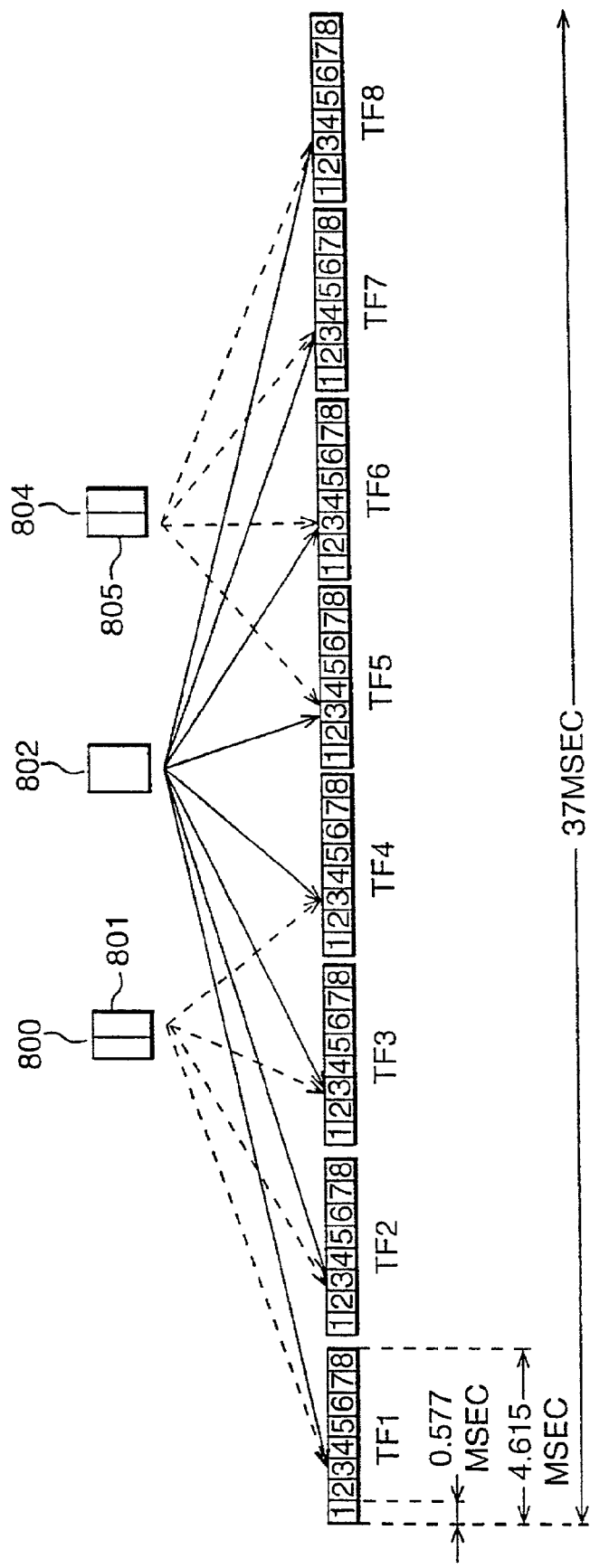

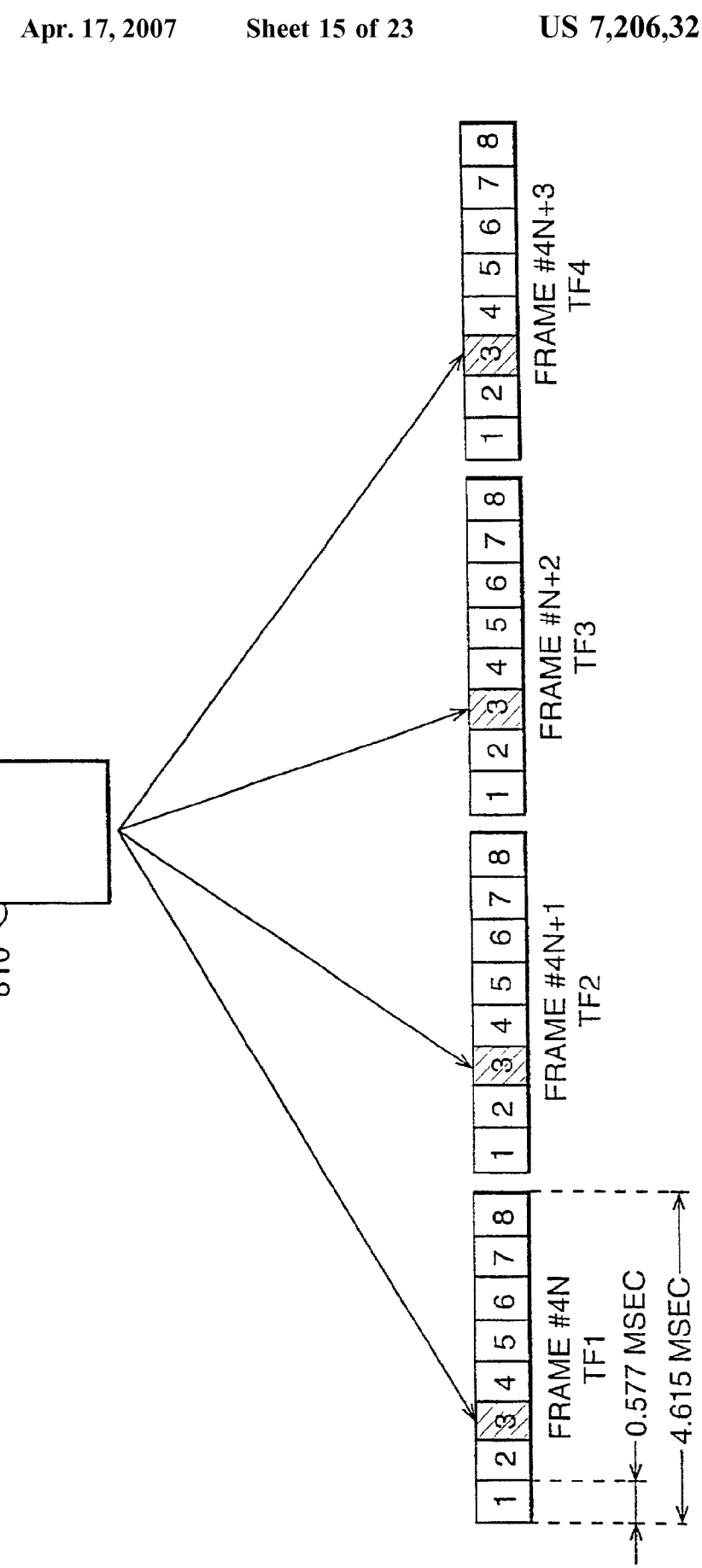

FIG. 23(a)
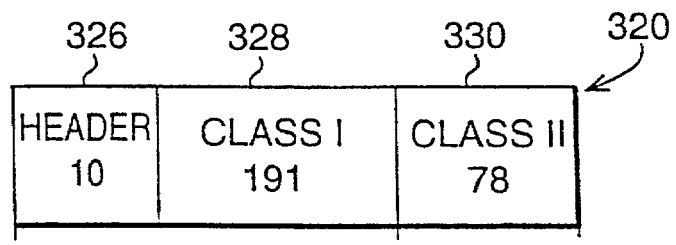
FIG. 23(b)
(3,1,7) CONVOLUTIONAL CODE PUNCTURING 181 BITS
UNCODED
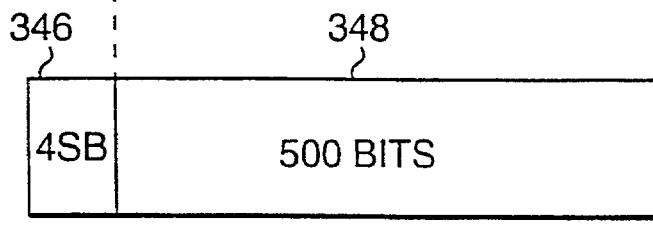
FIG. 23(c)
| 4SB | 500 BITS |
←——— 504 BITS ———→

UNEQUAL ERROR PROTECTION FOR PACKET SWITCHED NETWORKS

FIELD OF THE INVENTION

The present invention relates to encoding techniques for encoding multiple sets of data for transmission, and particularly but not exclusively to the encoding of voice from more than one user in a single RLC/MAC block for transmission on a packet switched network.

BACKGROUND TO THE INVENTION

Digital mobile communication systems for voice such as GSM (Global System for Mobile Communication), and DAMPS (Digital Advanced Mobile Systems) have expanded very rapidly in recent years.

In addition great demand for data service has been created by mobile users due to wide spread acceptance of the Internet. GPRS (General Packet Radio Service), EDGE (enhanced data rate for GSM), and UMTS (Universal Mobile Telecommunications Services) are all being developed to accommodate data users in wireless networks.

Schemes for the transmission of voice over fixed packet switch networks have also been developed in recent years and an increasing amount of voice traffic will be carried over packet switched networks in the future.

The enhanced data rate for GSM evolution (EDGE) is a proposal for the evolution of existing time division multiple access (TDMA) radio cellular systems in order to support higher transmission data rates and increase the capacity of these networks. The application of EDGE is restricted not only to GSM cellular networks but also has been accepted for the evolution of IS-136 systems by UWCC (Universal Wireless Communications Consortium). Enhanced data rates are achieved by introducing higher level modulation formats, such as 8-PSK (phase shift keying). With the introduction of such modulation schemes, EDGE systems can offer bit rates of up to approximately three times higher than standard GSM/GPRS/IS-136 systems.

EDGE was initially developed in order to provide data service at higher rates than GSM or GPRS, by making use of multi-phase modulation (such as 8-PSK) instead of binary GMSK. However, the structure of the proposed RLC/MAC blocks for data transmission do not allow for the efficient use of the available radio resources for voice transmission. Furthermore, due to the use of 8-PSK more powerful channel coding is required in order to maintain certain levels of voice quality.

The use of more powerful channel encoding techniques generates a larger number of encoded bits. If the number of bits encoded exceeds the number of bit spaces available, then puncturing is usually applied to remove certain bits. A performance trade off therefore exists between providing a powerful channel coding technique, but minimising the number of bits to be punctured.

SUMMARY OF THE INVENTION

According to the present invention there is provided a method of encoding at least two sets of data bits into a single encoded block, wherein each set of data bits includes a primary set of bits to be encoded and a secondary set of bits to remain unencoded, wherein the encoding technique requires a set of code terminating bits to be added to the primary set of bits, the method comprising: combining the two sets of primary bits; and encoding the combined two sets of primary bits, whereby one set of code terminating bits is added to the combined two sets of primary bits.

Preferred embodiments of the present invention advantageously provide an improved encoding technique suitable for efficient channel encoding of voice on an EDGE network.

The two sets of data bits may each include a header portion and a payload portion, the payload portion comprising encoded speech. The encoding step may be a channel encoding step for encoding the at least two sets of data bits for transmission on a packet switched network. The data bits may be for transmission on an EDGE packet switched network, wherein the at least two sets of data bits are encoded into a single RLC/MAC block.

According to the present invention there is also provided an encoder for encoding at least two sets of data bits into a single encoded block, each set of data bits including a primary set of bits to be encoded and a secondary set of bits to remain unencoded, wherein the encoding technique requires a set of code terminating bits to be added to each primary set of bits, the encoder comprising: input means for receiving the primary set of bits from each set of data bits and combining them; encoding mans for encoding the combined primary set of bits from each set of data bits; and output means for adding a single set of code terminating bits to the combined encoded primary sets of bits.

A packet switched network may include such an encoder.

The at least two sets of data bits may each include a header portion and a payload portion, the payload portion including encoded speech and the single encoded block being an RLC/MAC block.

The invention will now be described by way of example with reference to the accompanying drawings, in which:

BRIEF DESCRIPTION OF THE FIGURES

FIGS. 1(a) and (b) illustrate a first example of a header structure for transmitting voice over an EDGE network;

FIGS. 4(a) and (b) illustrates system performance improvements using the header of FIG. 3;

FIG. 5 illustrates an encoder for generating the header of FIG. 3(a);

FIG. 6 illustrates a decoder for decoding the header of FIG. 3(a);

FIG. 7 illustrates circuitry for generating an RLC/MAC block in the down-link of an EDGE system;

FIGS. 8(a) to 8(c) illustrate one embodiment of the generation of an RLC/MAC block from two speech frames from the same user in the down-link of an EDGE network utilising the circuit of FIG. 7;

FIGS. 9(a) to 9(c) illustrate an embodiment, corresponding to the embodiment of FIG. 8, for generating an RLC/MAC block in the up-link of an EDGE system;

FIGS. 10(a) to 10(e) illustrate one embodiment of the generation of an RLC/MAC block from four speech frames from different users in the down-link of an EDGE network;

FIGS. 11(a) to 11(e) illustrate an embodiment, corresponding to the embodiment of FIG. 10, for generating an RLC/MAC block in the up-link of an EDGE system;

FIGS. 15(a) to (d) illustrate conventional interleaving techniques;

FIGS. 23(a) to 23(c) illustrate an embodiment, corresponding to the embodiment of FIG. 19, for generating an RLC/MAC block in the up-link of an EDGE system;

DESCRIPTION OF PREFERRED EMBODIMENTS

Figure 2A:
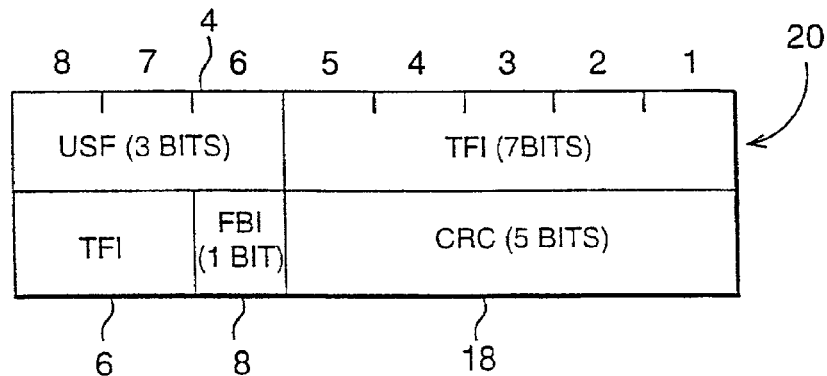
FIGS. 2(a) and (b) illustrate a second example of a header structure for transmitting voice over an EDGE network.

The enhanced data rate for GSM evolution (EDGE) has been developed to support the transmission of data packets in wireless networks. Networks supporting the transmission of data packets are conventionally known as packet switched networks. In packet switched networks such as EDGE, the data is transmitted in data packets which include a header and a payload. Each data packet is encoded into a Radio Link Control/Medium Access Control (RLC/MAC) block. The payload includes the information portion of the data packet. The header includes control and routing information associated with the data packet. For example, the header usually includes the destination address of the data packet, error checking information, and control bits for enabling receipt of the packet to be acknowledged, and if necessary to request retransmission of the packet. One characteristic of data packet transmission is that if the receiver in the network does not successfully receive the transmitted packet. then retransmission of the data packet is requested.

In sending voice, as opposed to data, the requirements for transmission are different. For example, in voice transmission it is impractical for information to be re-transmitted because of time delay constraints. Therefore voice transmission in packet switched networks is unacknowledged voice packet transmission. In addition, with voice different bits of the encoded speech have different importance, and it is acceptable for certain bits to be lost. However in data every bit is assumed to have equal importance, and no bits should therefore be lost.

It is herein proposed to transmit voice over an EDGE packet switched network. In order to do this, a new RLC/MAC block structure is proposed in which the conventional EDGE header is modified to include those fields required to support only voice transmission. Referring to FIG. 1, there is shown a first embodiment of a new RLC/MAC block header, suitable for transmission of voice over EDGE. The new RLC/MAC block structure includes a header which is reduced compared to the header of the data packets for EDGE. That is, the length of the header is shorter than that which is required for the transmission of data packets.

Thus to send voice over an EDGE network, it is proposed to change the RLC/MAC block of a standard data packet. The new block contains a header, and a payload consisting of the coded speech bits coded using a standard GSM speech encoder.

This new RLC/MAC block is coded in a different way from that of a known standard EDGE packet. This change of coding is required because for speech data different bits have different importance whereas for data every bit has equal importance.

FIG. 1(a) shows a header for transmission of voice in the down-link of an EDGE network. prior to channel encoding into an RLC/MAC block. The header 2 comprises an up-link status flag (USF) field 4, a temporary flow identity (TFI) field 6, and a final block indicator (FBI) field 8. The USF field is a 3 bit field, the TFI field is a 7 bit field, and the FBI field is a 1 bit field. All these fields, and there lengths, are defined by the GPRS standard which EDGE utilises, and the functionality of these fields in the reduced header is the same as in the normal header used in EDGE for data packet transmission.

FIG. 1(b) shows a header for transmission of voice in the up-link of an EDGE network. The header 10 comprises a temporary flow identity (TFI) field 12, a speech flag (SF) field 14, and a final block indicator (FBI) field 16. The TFI field is a 7 bit field, the SF field is a 2 bit field, and the FBI field is a 1 bit field. The speech flag field is newly introduced into an EDGE header, and corresponds to the S/P bit in GPRS.

In one preferable implementation of voice over EDGE as discussed hereinbelow, each EDGE RLC/MAC block contains two speech frames, and therefore two speech flags are preferably provided in the up-link header of FIG. 1(b), in order to signal whether each of these frames corresponds to silence or voice. The speech flag field may be increased or reduced in dependence on whether more or less speech frames are included in the RLC/MAC block.

For completeness, a summary of each field of the up-link and down-link headers of FIG. 1 is given hereinbelow, but one skilled in the art will be familiar with these fields and their functionality.

The USF field is used for unique addressing of the mobiles. Specifically, when a mobile receives a packet in the down-link, and reads the packets header and finds that it contains it's USF, this means that the base station has given permission to this mobile to transmit its packets on the up-link in a predefined timeslot.

The TFI field uniquely identifies a data flow. When a call is established, it is assigned a unique number. When a mobile station or a base station receives a packet and reads its header it knows which data flow (call) this packet belongs to, by reading the TFI field.

When the SF field is set to 1, the speech frame corresponds to speech. If the SF field is set to 0, the speech frame corresponds to silence.

When the FBI field is set to 1, this is an indication to the receiver that the current data flow is ended. If the FBI field is set to 0, this means that there are more packets to be transmitted in the current data flow.

FIG. 2 shows a second embodiment of the new header for transmission of voice over EDGE. FIG. 2(a) shows the header for transmission of voice in the up-link of an EDGE network further modified to include a set of error checking bits in a cyclic redundancy checking (CRC) field 18. The new header 20 still includes the USF field 4, the TFI field 6, and the FBI field 8.

Figure 2B:
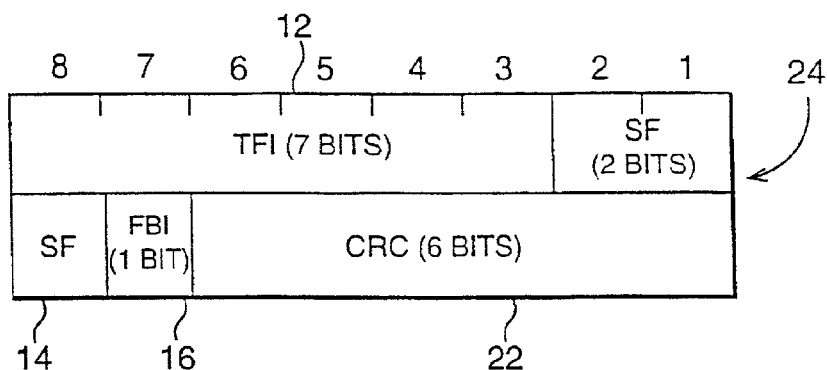

FIG. 2(b) shows the header for transmission of voice in the down-link of an EDGE network also further modified to include a set of error checking bits in a cyclic redundancy checking (CRC) field 22. The new header 24 still includes the TFI field 12, the SF field 14, and the FBI field 16. The provision of the error checking bits provides extra protection for the header. Although the headers of FIGS. 2(a) and 2(b) are described with reference to a CRC field for error checking, it will be appreciated that any other error checking scheme suitable for detection of errors may be utilised in accordance with the application.

The size of the CRC field in both the up-link and the down-link headers is dependent upon the error code used in the system. In a simple error checking scheme, the CRC field is generated in dependence upon the other fields in the header. At the receiver, the error field is compared to a recalculation of the CRC field based on the received header, and if an error is detected then the speech block is discarded. In data transmission this is normal, and re-transmission of the data packet may be requested after the original packet is discarded.

In voice, as mentioned hereinabove, re-transmission is impractical. If voice is sent in packet switched networks then the standard error techniques can result in a speech block being discarded on the basis of an error in the header alone, even when the speech in the payload is error free.

Therefore there is proposed herein a further new header, generally applicable to any network in which information is sent in a block comprising a header and a payload. This new header is described herein with reference to a third embodiment of the header for voice over EDGE described with reference to other embodiments in FIG. 1 and FIG. 2, but it will be appreciated that the technique is in fact applicable to all packet switched networks. i.e. environments in which information is conveyed in packets or blocks having a header portion and a payload, whether the packet or block conveys speech or data.

The principle of this new header is to provide an error field in the header which is generated in dependence only on bits contained in the header. This error field is then used at the receiver end to determine whether there are any errors present in the header. If one or more errors are present in the header, then the nature of the error field is such that the receiver can attempt to correct the error or errors introduced during transmission.

This means that blocks which are error free in the payload, or contain acceptable errors, are not automatically discarded. Therefore system performance is increased, particularly for the transmission of speech in packet switched networks.

Figure 3A:
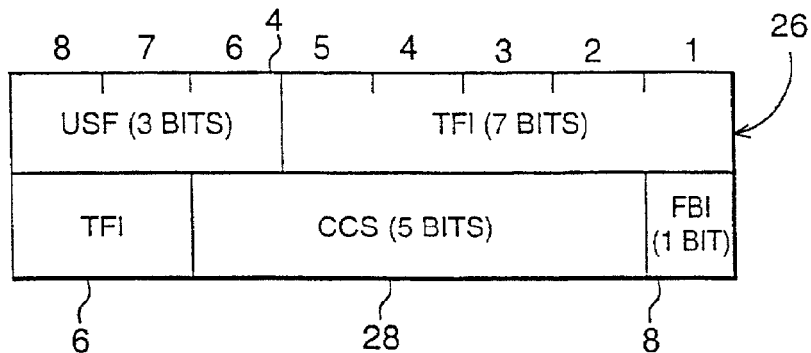
FIGS. 3(a) and (b) illustrate a third example of a header structure for transmitting voice over an EDGE network.

Referring to FIG. 3(a), the up-link header for transmitting voice over EDGE is therefore modified still further to produce a new header 26 in which the error checking field comprises a cyclic code scheme (CCS) field 28. Similarly referring to FIG. 3(b), the down-link header for transmitting voice over EDGE has been modified still further to produce a new header 30 in which the error checking field comprises a cyclic code scheme (CCS) field 32.

In the header 26 for the up-link for an EDGE network, a 15,10 cyclic code is preferably used for protection of the header, having the following generator polynomial:

$$g(D)=D^5+D^4+D^2+1$$

Thus a 15 bit header is generated from the original 9 bits of the header. In accordance with the standard EDGE, the FBI bit is not included in the calculation of the CCS field. Such cyclic codes are well-known, and within the scope of one skilled in the art. This block code has double-burst-error-correcting ability and single random error correction capability. It can detect up to 3 random errors. It can detect all burst error patterns of length 5 or less. The fraction of undetected error patterns of length equal to 6 is 0.0625. The fraction of undetected error patterns of length larger than 6 is 0.03125. The code has minimum distance of 4 and is the best code known with length 15 and dimension 10.

In the header 30 for the down-link for an EDGE network a 15,9 cyclic code is preferably used for protection of the header, and has the following generator polynomial:

$$g(D)=D^6+D^5+D^4+D^3+1$$

Thus a 15 bit header is generated from the original 10 bits of the header. In accordance with the standard EDGE, the FBI bit is again not included in the calculation of the CCS field. This block code has burst error correcting ability of three, and single random error correction ability. It can detect up to 2 random errors. It can also detect all error patterns of length up to 6. The fraction of undetected error patterns of length equal to 7 is 0.03125. The fraction of undetected error patters of length 8 or higher is 0.015625. It is clear that the TFI and SF fields are well protected and the error probability is significantly reduced with this code which has triple burst error correcting ability.

Syndrome, which is the result of a calculation done at the receiver upon reception of a code word, will be calculated for headers without error correction. If the syndrome value is zero, this is an indication that the code word contains no errors. The manner in which the syndrome is calculated depends upon the specific code used. The RLC block will thus be accepted if the syndrome is right. If the syndrome is wrong the header will be sent for error correction. The RLC block will be discarded if the error corrector still indicates there are errors in the header because the number of errors exceeds the code error correction ability. When the error corrector indicates there are no errors in the header after error correction, the RLC block will be accepted and it assumes any errors in the header have been corrected. FIG. 4 illustrates the simulation of performance results in the down-link and the up-link, comparing the performance with and without error correction. In the simulation the system is assumed to be interference free, and all results are presented as a function of carrier to interference ratio expressed in dB. Typical urban (TU) propagation conditions are assumed, and the mobile stations have a speed of 3 km/hr. Ideal frequency hopping is utilized. During these simulations the number of dropped headers when error detection is used as well as the number of dropped headers when error correction is not used were calculated. In all cases a total number of 5000 RLC/MAC block transmissions have been simulated.

In both FIGS. 4(a) and 4(b) the performance table has four columns. A first column 34 shows the carrier to interference ratio as discussed above, a second column 36 shows the number of dropped headers without error correction, a third column 38 shows the number of dropped headers with error correction, and a fourth column 40 shows the percentage improvement obtained by employing the new technique.

In FIG. 4(a), results for the down-link case where the 15,10 cyclic code is utilized are shown. The relative percentage improvement arising from the use of error correction is also shown. FIG. 4(b) shows corresponding results for the case of up-link transmission where the 15,9 cyclic code is utilized.

The headers with errors that have been corrected are between approximately 10 to 20 percent according to the simulations. Because one corrected header will save at least one speech frame, it will improve the quality of speech significantly.

Referring to FIG. 5, there is shown a block diagram of an encoder circuit for generating a header for the down-link as shown in FIG. 3(a). The encoder circuit comprises a control circuit 50, a USF field generator circuit 52, a TFI field generator circuit 54, a FBI field generator circuit, a cyclic code generator circuit 58, and an output circuit 60. The control circuit 50 generates control and timing signals on lines 72 to each of the cyclic code generator circuit 58, and the header field generator circuits 52, 54 and 56. The outputs of each of the USF and TFI header field generator circuits 52 and 54 on lines 74 and 76 respectively form inputs to the cyclic code generator circuit 58. The cyclic code generator circuit generates the cyclic code from the 10 bits of the respective fields of the header as discussed hereinabove, and generates the cyclic code on line 80, and the FBI field on line 78. The output circuit receives as an input the output of the cyclic code generator circuit on line 80. The output circuit then orders the signals on lines 74, 78 and 80 appropriately and generates the header of FIG. 3(a) on line 68. Embodiments of the further encoding of the header are described further hereinbelow.

Figure 3B:
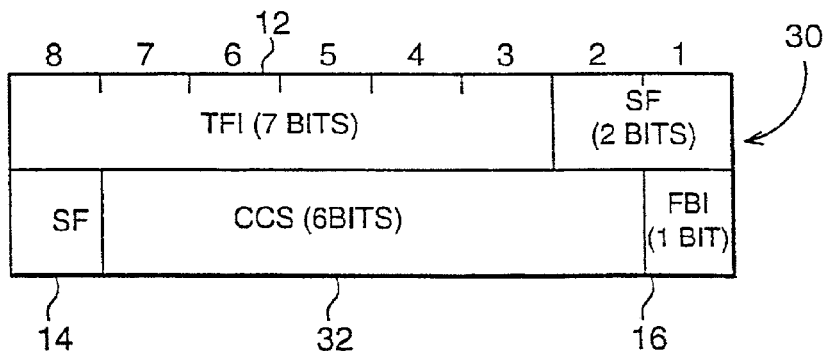

It will be appreciated, from the block diagram of FIG. 5, how the encoder may be modified to provide an encoder for the up-link to generate the header structure of FIG. 3(b).

Referring to FIG. 6, there is shown a block diagram of the part of the header decoding circuitry for error correction in the down-link. The part of the header decoding circuitry includes an input circuit 62, a cyclic code generator circuit 64, and an error correction and detection block 66. The input circuit receives the 16 bits of the decoded header, having the format of FIG. 3(a), on line 70. The five bits of the cyclic code are provided on line 84 to the error correction and detection block. The 12 bits of the header on which the cyclic code is based are provided on line 82 to the cyclic code generator circuit, which applies the same cyclic code applied in the cyclic code generator circuit 58 of the transmitter. The thus generated additional cyclic code is presented on line 86 to the error correction and detection circuit 66. Thus the error correction and detection circuit 66 detects the presence of an error and attempts to correct it as discussed hereinabove. Again, from the description hereinabove it can be readily understood how the circuit of FIG. 6 can be modified for the up-link.

In the following discussion, specific examples of encoding speech frames for transmission over EDGE are given. In these example one or another of the improved headers discussed hereinabove is utilised. It will be apparent, however, that alternative headers may be used whilst still gaining from the advantages of the described encoding techniques.

In transmitting voice over EDGE, it is advantageous wherever possible to use the components of a standard speech encoder for generating the speech frames for transmission. In the following examples, standard GSM speech encoders are utilised. However, other speech encoders may be utilised. In GSM, speech frames have Class I bits and Class II bits, and the Class I bits are further split into a Class Ia category and a Class Ib category. In general in speech different bits have different importance, and therefore in a more general case the important bits (Class I in GSM) can be considered as primary bits, and the less important bits (Class II in GSM) can be considered as secondary bits.

Two Speech Frames from Same User

FIG. 7 illustrates a block diagram of an encoder suitable for encoding two speech frames on the down-link of an EDGE system, when the two speech frames are associated with the same user. The encoder comprises a pair of preliminary coding circuits 104 and 106, a pair of block code circuits 112 and 118, a pair of reordering circuits 114 and 120, a pair of convolution encoders 126 and 128, an output circuit 116, and a further block code circuit 140.

A standard GSM enhanced full-rate speech encoder generates a speech frame having 244 bits. 174 of these bits are Class I bits, of which 50 are Class Ia and 124 are Class Ib. The remaining 70 bits are Class II bits. The 244 bits of a first speech frame U1SF1 from a first user are received on a signal line 100, and the 244 bits of a second speech frame U1SF2 from the same first user are received on a signal line 102. Each of the 244 bit speech frames U1SF1 and U1SF2 are input to one of the respective preliminary coding circuits 104 and 106.

The preliminary coding circuits 104 and 106 each generate, on a respective output signal line 108 and 110, a set of 260 bits. Each speech frame U1SF1 and U1SF2 of 244 bits are passed through one of the preliminary coding circuits to produce a respective set of 260 bits. The additional 16 bits are generated in the preliminary coding circuits by an 8-bit cycle redundancy code on the most important 65 bits of the Class I bits, and by two repetitions of the four most important Class II bits. Thus each speech frame speech frame is modified to have 50 Class Ia bits, 132 Class Ib Bits, and 78 Class II bits, giving a total of 260 bits. This preliminary coding step is in accordance with standard GSM techniques.

The 50 Class Ia bits on the signal line 108 are input to the block code circuit 112. Thereafter the 50 Class Ia bits are used to generate 3 parity bits, such that 53 bits are generated on the output line 121 of the block code circuit. Similarly the 50 Class Ia bits on the signal line 110 are input to the block code circuit 118, which generates 53 bits (including 3 parity bits) on line 124.

The 132 Class Ib bits on signal line 108 are input to the reordering circuit 114. The 132 Class Ib bits on signal line 110 are input to the reordering block circuit 120. The 53 bits on signal line 121 form a further input to the reordering circuit 114, and the 53 bits on signal line 124 form a further input to the reordering circuit 120.

Each of the respective re-ordering circuits 114 and 120 additionally receive a set of six tail bits TB on the signal line 130 and 132 respectively. A tail is then added to the end of the Class I bits, in the reordering blocks 114 and 120 respectively, which are used as trellis termination for the convolution encoder utilised for the further encoding of the Class I bits as discussed below. In EDGE six tail bits are added.

The reordering circuit 114 reorders the 53 Class I bits on lines 121, the 132 Class I bits on line 108, and the 6 tail bits on line 130 to generate 191 Class I bits on signal line 122. The reordering circuit 120 reorders the 53 Class I bits on lines 124, the 132 Class I bits on line 110, and the 6 tail bits on line 132 to generate 191 Class I bits on signal line 125.

The 191 bit outputs on lines 122 and 124 respectively form inputs to the respective convolution encoder circuits 126 and 128.

The 78 Class II bits on line 108 are input directly to the output block 116. The 78 Class II bits on line 110 are input directly to the output block 116.

Thus the 244 bit speech frames U1SF1 and U1SF2 are encoded, at this stage, into respective 269 bit speech frames having 191 Class I bits and 78 Class II bits.

The encoding of the speech frame up to now is in conformance with speech encoding techniques used in GSM, and may be implemented in a standard GSM speech encoder. The one difference is that in standard GSM only four tail bits are required. Therefore in standard GSM there are usually only 189 Class I bits at this stage.

In this advantageous embodiment of encoding two speech frames, an efficient coding technique is able to be utilised by encoding only one header, as opposed to two. That is, it is recognised that the headers associated with the two speech frames are identical as they are associated with the same user. Therefore, one header is discarded, resulting in a fewer number of bits needing to b encoded, as described below As will also become apparent from the following description, the requirement for the encoding of only one header when the speech frames are generated using an enhanced full-rate encoder enables two speech frames to be encoded into a single RLC/MAC block without the need for any puncturing in the encoding, resulting in a very efficient coding scheme.

The 16 bits of the down-link header are presented on signal line 138. In this example the advantageous header structure for the down-link of FIG. 3(*a*) is utilised. The three USF bits form an input to the block code circuit 140, which generates 36 bits on its output signal line 142 to the output circuit 116. utilising a standard block code from EDGE. The other 13 bits of the header on line 138 form a further input to the convolution encoder circuit 126.

Referring to FIG. 8(*a*), there is shown the unencoded down-link speech block or packet described up to now. The 3 bits of the USF field of the header on line 138 are designated by numeral 150, the remaining 13 bits of the header on line 138 are designated by reference numeral 152. The 191 Class I bits of the first speech frame from the first user on line 122 are designated by reference numeral 154, and the 78 Class II bits of the first speech frame from the first user on line 108 are designated by reference numeral 156. The 191 Class I bits of the second speech frame from the first user on line 124 are designated by reference numeral 158, and the 78 Class II bits of the second speech frame from the first user on line 110 are designated by reference numeral 160.

As discussed hereinabove, the three USF bits of the down-link header are block coded into 36 bits and passed to the output circuit 116, as designated by reference numeral 162 in FIG. 8(*b*). For the encoding of the USF field in the header the 36,3 linear block code as suggested for EDGE data transmission is used. The code is given below in Table I.

TABLE I

| USF | Encoded USF |
|---|---|
| 000 | 000000000000000000000000000000000000 |
| 001 | 000000111001011110010011101110101111 |
| 010 | 000110010111100100111011101 01111000 |
| 011 | 000111110010101100011100110 11010111 |

TABLE I-continued

| USF | Encoded USF |
|---|---|
| 100 | 111001011110010011101110101111000000 |
| 101 | 111001100111001101111101000001101111 |
| 110 | 111110010101100001110011011010111000 |
| 111 | 111110101100111111100000110100010111 |

The 191 Class I bits of the first speech frame on line 122 are combined with the remaining 13 bits of the header (i.e. all fields except the 3 USF bits) on line 138 in the convolutional encoder circuit 126. A 3,1,7 convolution code is utilised in the convolution encoder circuit 126 to generate 612 bits on the output signal line 134, which are passed to the output circuit 116. These 612 bits are designated by reference numeral 164 in FIG. 8(*b*).

The 3,1,7 code utilised in this preferred embodiment is more powerful than one proposed for data transmission in EDGE. The code has a rate of ⅓ and a constraint length of 7 and therefore it is of the same complexity with the proposed for EDGE.

The generator polynomials of the rate 3,1,7 convolutional code are as follows:

$$G_0(D)=1+D^2+D^3+D^5+D^6$$

$$G_1(D)=1+D+D^2+D^3+D^4+D^6$$

$$G_2(D)=1+D+D^4+D^6$$

This code is the best known code in its class. The free distance of the code is $d_{free}=15$. The code proposed in EDGE has a free distance of 14 (when puncturing is not applied).

The 78 Class II bits are passed to the output circuit 116 unencoded from line 108. and are designated by reference numeral 166 in FIG. 8(*b*). It is standard in GSM for the Class II bits to be unencoded.

The 191 Class I bits of the second speech frame on line 125 are input to the convolutional encoder circuit 128. The 3,1,7 convolution code is again utilised in the convolution encoder circuit 126 to generate 573 bits on the output signal line 136, which are passed to the output circuit 116. These 573 bits are designated by reference numeral 168 in FIG. 8(*b*).

The 78 Class II bits are passed to the output circuit 116 in unencoded form on line 110, and are designated by reference numeral 170 in FIG. 8(*b*).

The output circuit 116 additionally receives 4 stealing bits SB on line 146. The four stealing bits are used to signal the type of the header (as in data transmission over EDGE). Each TDMA burst contains one stealing bit. Four stealing bits are therefore provided, as it is proposed herein that the RLC/MAC block is spread over four bursts as for data over EDGE. In addition to the 1377 bits generated and as shown in FIG. 8(*b*), this leaves the total number of bits as 11 short of the number of bits available in an EDGE RLC/MAC block. Thus the output circuit 116 additionally receives 11 spare bits SPB on line 148. The output circuit then generates the completed EDGE RLC/MAC block on line 149, comprising 1392 bits, for transmission.

Referring to FIG. 8(*c*), the completed RLC/MAC block for the down-link is illustrated, and corresponds to the format shown in FIG. 8(*b*) with the addition of the 4 stealing bits designated by reference numeral 172, and the 11 spare bits designated by reference numeral 174. Reference numeral 176 represents the 1377 bits of FIG. 8(b).

In practice only one of the convolution encoders 126 or 128 may be provided. Such a single convolution encoder may be utilised for encoding both speech frames in sequence.

Whilst the above description has been in relation to the transmission of two speech frames in the same RLC/MAC block in the down-link, and FIG. 8 represents a summary of the channel coding for transmission of two speech frames in one RLC/MAC block for down-link transmission, similar techniques apply in the up-link. FIG. 9 illustrates the channel coding principle applied for transmission of two speech frames in one RLC/MAC block for up-link transmission.

The encoder for generating the RLC/MAC block in the up-link will be very similar to that in the down-link shown in FIG. 7, and is therefore not shown herein. The encoder in the up-link differs in that the block code circuit 140 for the header is not provided, and all 16 bits of the up-link header of FIG. 3(b) are combined with the 191 bits on line 122 in the convolution encoder. In addition, the number of spare bits in the RLC/MAC block following convolution encoding is 38, and hence the number of spare bits SPB on line 148 is increased to 38.

Referring to FIG. 9(a), there is shown the unencoded up-link speech block or packet. The 16 bits of the header on line 138 are designated by reference numeral 180. The Class I bits of the first speech frame from the first user on line 122 are designated by reference numeral 182, and the Class II bits of the first speech frame from the first user on line 108 are designated by reference numeral 184. The Class I bits of the second speech frame from the first user on line 124 are designated by reference numeral 186, and the Class II bits of the second speech frame from the first user on line 110 are designated by reference numeral 188.

The 191 Class I bits of the first speech frame on line 122 are combined with 16 bits of the header on line 138 in the convolutional encoder circuit 126. A 3,1,7 convolution code is again utilised in the convolution encoder circuit 126 to generate 621 bits on the output signal line 134, which are passed to the output circuit 116. These 621 bits are designated by reference numeral 190 in FIG. 9(b).

The 78 Class II bits are passed to the output circuit 116 unencoded from line 108. and are designated by reference numeral 192 in FIG. 9(b).

The 191 Class I bits of the second speech frame on line 125 are input to the convolutional encoder circuit 128. A 3,1,7 convolution code is again utilised in the convolution encoder circuit 126 to generate 573 bits on the output signal line 136, which are passed to the output circuit 116. These 573 bits are designated by reference numeral 194 in FIG. 9(b).

The 78 Class II bits are passed to the output circuit 116 unencoded from line 110, and are designated by reference numeral 196 in FIG. 9(b).

Referring to FIG. 9(c), the completed RLC/MAC block for the up-link is illustrated, and corresponds to the format shown in FIG. 9(b) with the addition of the 4 stealing bits designated by reference numeral 198, and the 38 spare bits designated by reference numeral 202. Reference numeral 200 represents the bits of FIG. 8(b).

On the up-link or the down-link the 1392 bits of the RLC/MAC block are passed to an 8-PSK modulator of the EDGE encoder. The RLC/MAC speech blocks are preferably interleaved over four bursts, as in the transmission of data packets in EDGE.

At the receiver, the reverse decoding stages are utilised. If the header of a received speech frame is in error, then an error correction is attempted. If the error correction is successful, the received speech frame may still then be discarded if either of the two CRC checks is not successful (the 3 bits protecting the 50 Class Ia bits or the 8 bits CRC protecting the 65 most important Class I bits).

Thus in the above there has been described a technique for encoding two speech frames from the same user in a single RLC/MAC block for transmission over EDGE. Although this technique has been specifically described in relation to a technique for transmitting voice over EDGE, it applies more broadly to the transmission of voice over packet switched networks. The technique allows two speech frames from one user to be encoded into a single RLC/MAC block using an encoding scheme which is proven to be advantageous. More importantly, there is no requirement for any puncturing of bits in implementing the encoding scheme. That is, there is no need to remove bits of the encoded speech frames to ensure that the number of bits fits into the RLC/MAC block, as may normally be expected to be required with the encoding of speech data. This particular advantage is achieved by utilising the characteristic that if two speech frames are from the same user, then the headers associated with those speech frames are identical. Therefore one of the headers is redundant and can be removed from the packet to be encoded. This reduces the number of bits to be encoded and allows a particularly advantageous coding scheme to be utilised.

In addition, it should be appreciated that this technique may be advantageously utilised in encoding of more than two speech frames from the same user in a single RLC/MAC block. Regardless of the number of speech frames, if they are from the same user only one header is required.

In the following description, two examples are given of the encoding of two speech frames which are associated with different users. One characteristic of speech frames from different users is that in the down-link one user does not have any information about the other user.

The principle described hereinabove for encoding four speech frames from the same user in a single RLC/MAC block may be further extended to the encoding of larger numbers of speech frames from the same user in a single RLC/MAC block.

Two Speech Frames from Different User—Case I

Figure 12:
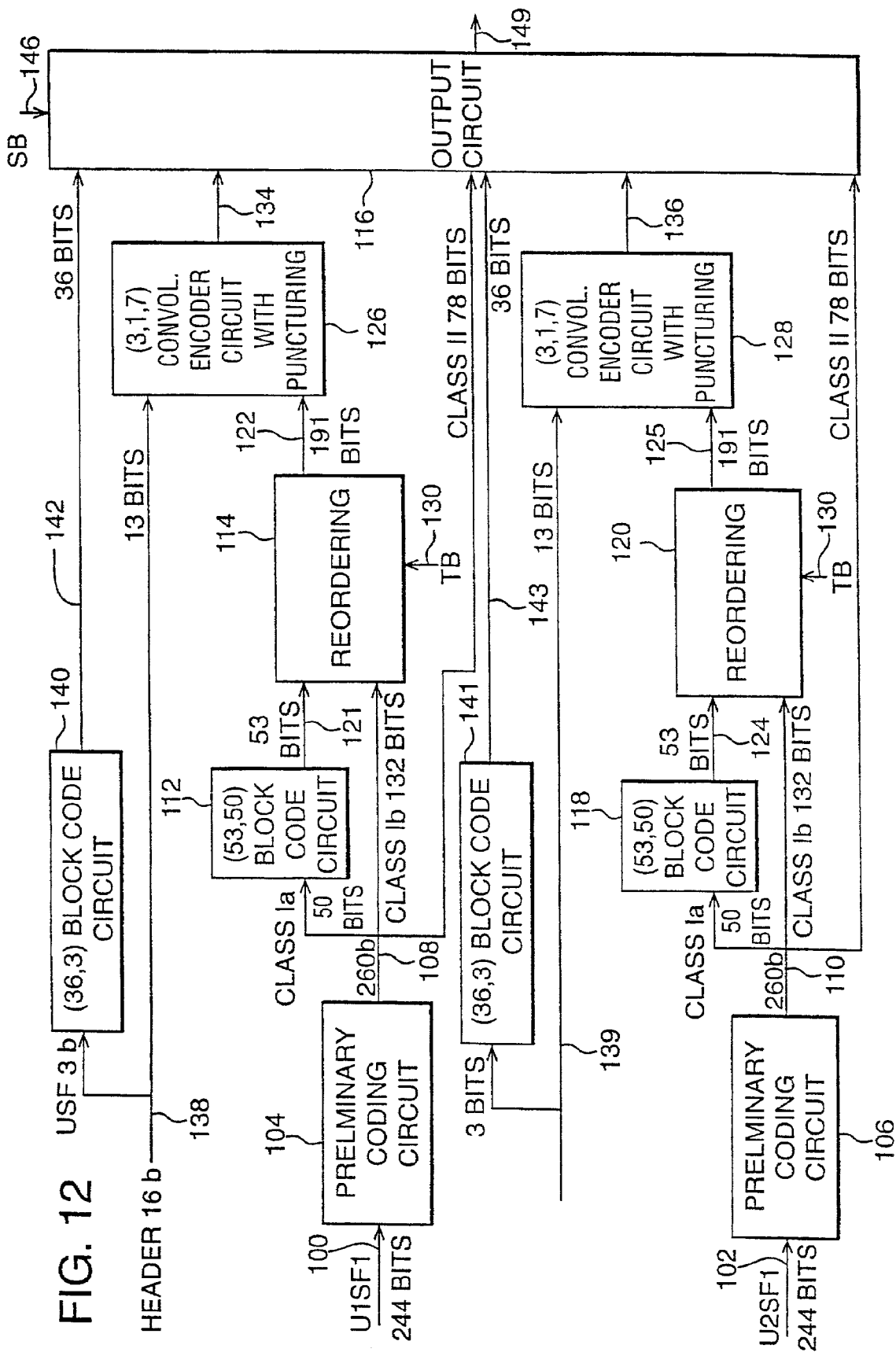
FIG. 12 illustrates circuitry for generating an RLC/MAC block in the down-link of an EDGE system.

Referring to FIG. 12, there is shown a block diagram illustrating one embodiment for encoding two speech frames from two different users in the down-link of a packet switched network. The down-link encoder of FIG. 12 corresponds substantially to the down-link encoder of FIG. 7, and like reference numerals have been used to denote like elements. The main difference lies in the addition of a further block code circuit 141. In addition the convolution encoder circuits 126 and 128 are modified to additionally include puncturing, as will be described further hereinbelow.

This embodiment utilises the 244 bit speech frames generated by an enhanced full-rate GSM speech encoder, as described hereinabove with reference to FIG. 7. The 244 bits of a first speech frame U1SF1 from a first user are received on the signal line 100, and the 244 bits of a first speech frame U2SF1 from a second user are received on the signal line 102. Each of the 244 bit speech frames U1SF1 and U2SF1 are processed by the preliminary coding circuits 104 and 106, the block code circuits 112 and 118, and the reordering circuits 120 exactly as described hereinabove with reference to FIG. 7.

As the two speech frames are from different users, then there are two respective different headers associated with each speech frame. Hence the block code circuit 141 is introduced to handle the header associated with the second user speech frame on line 102. The header associated with the first user speech frame on line 100 is processed in the same manner as the common header is processed in the circuit of FIG. 7, by the block code circuit 140.

The 16 bits of the down-link header for the second user associated with the speech frame U2SF1 are presented on signal line 139. The three USF bits form an input to the block code circuit 141, which generates 36 bits on its output signal line 143 to the output circuit 116, utilising the standard block code from EDGE discussed hereinabove with reference to FIG. 7. The other 13 bits of the header on line 139 form a further input to the convolution encoder circuit 128.

Figures 13A, 13B, 13C:
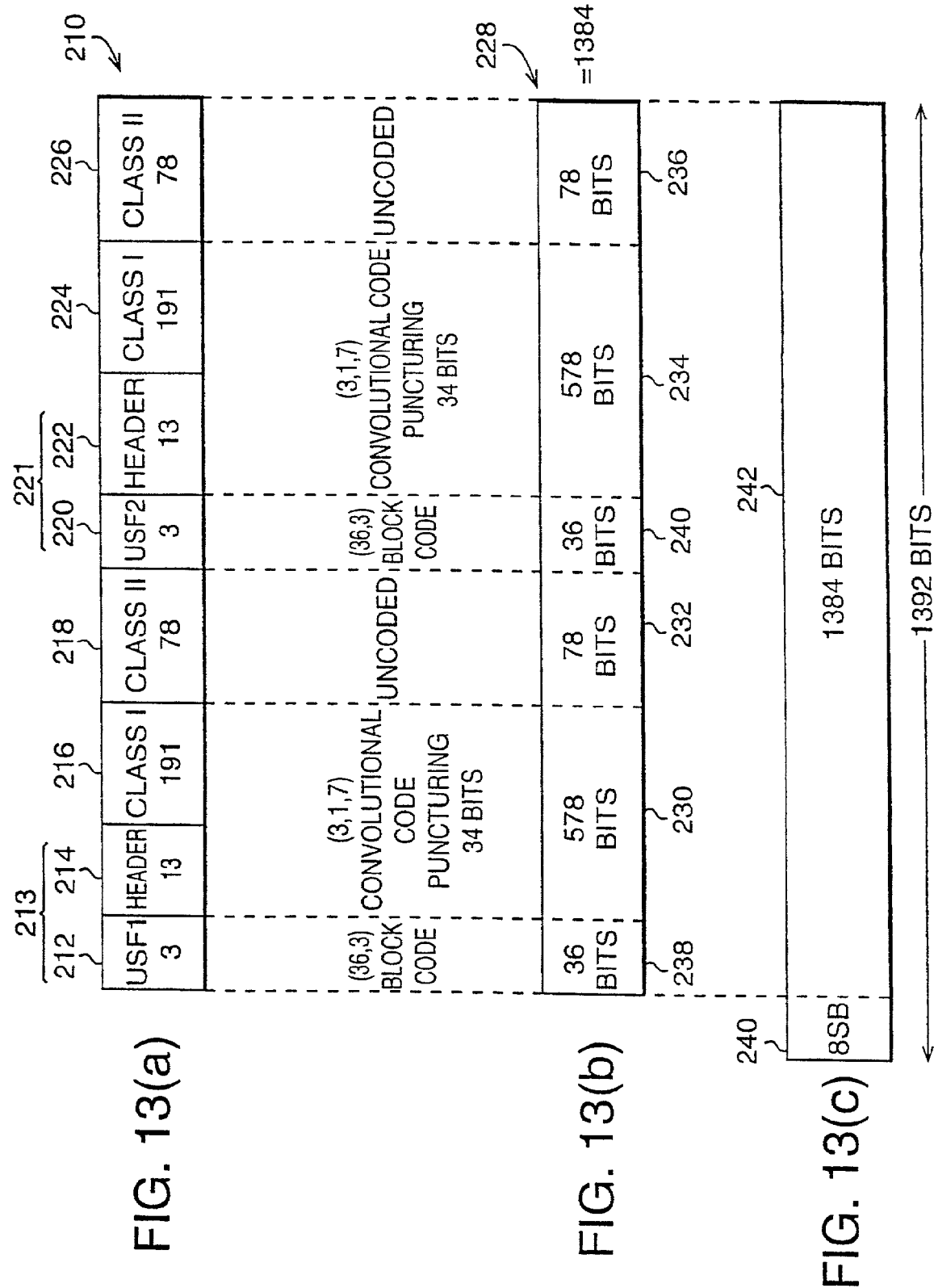
FIGS. 13(a) to 13(c) illustrate one embodiment of the generation of an RLC/MAC block from two speech frames from different users in the down-link of an EDGE network utilising the circuit of FIG. 12.

Referring to FIG. 13(a), there is shown the unencoded down-link speech block or packet, including two speech frames from two different users, prior to the operation of the convolutional encoder circuits with puncturing 126 and 128. In this example, each speech frame advantageously utilises the header format of FIG. 3(a). A first speech frame from a first user thus includes a USF field 212 of the header 213, and the remainder of the header is designated by reference numeral 214. The Class I bits of the first speech frame from the first user are designated by reference numeral 216, and the Class II bits from the first speech frame from the first user are designated by reference numeral 218. A first speech frame from a second user includes a USF field 220 of the header 221, and the remainder of the header is designated by reference numeral 222. The Class I bits of the first speech frame from the second user are designated by reference numeral 224, and the Class II bits from the first speech frame from the second user are designated by reference numeral 226.

As discussed above, the 3 bits of the USF field 212 of the header associated with the first user are block encoded in the block code circuit 140 to give 3 bits on line 142, designated by reference numeral 238 in FIG. 13(b).

The 191 Class I bits of the first speech frame from the first user on line 122 are combined with 16 bits of the header on line 138 in the convolutional encoder circuit with puncturing 126. A 3,1,7 convolution code is again utilised in the convolution encoder circuit 126, and the encoder circuit punctures 34 bits such that 578 bits are generated on the output 134 of the encoder circuit. These 578 bits are designated by reference numeral 230 in FIG. 13(b).

In a preferable implementation, the puncturing scheme used is as follows:

$$b(9+j*17) j=0, 1 \ldots 33,$$

where b(i) is the output of the 3,1,7 encoder. This scheme will not puncture any CRC bits. For Class I bits, the total output is 573 bits, with the CRC bits located in positions 151 to 159. The closest bits to the CRC which are punctured are bits 145 and 162. The last bit punctured is 570.

The 78 Class II bits 218 are passed to the output circuit 116 unencoded from line 108, and are designated by reference numeral 232 in FIG. 13(b).

As discussed above, the 3 bits of the USF field 220 of the header associated with the second user are block encoded in the block code circuit 141 to give 3 bits on line 143, designated by reference numeral 240 in FIG. 13(b).

The 191 Class I bits of the first speech frame from the second user on line 125 are input to the convolutional encoder circuit 128. A 3,1,7 convolution code is again utilised in the convolution encoder circuit 128, and the encoder circuit punctures 34 bits such that 578 bits are generated on the output 136 of the encoder circuit 128. These 578 bits are designated by reference numeral 234 in FIG. 13(b).

The 78 Class II bits 224 are passed to the output circuit 116 in unencoded form on line 110, and are designated by reference numeral 236 in FIG. 13(b).

The encoder of FIG. 12 also differs from that of FIG. 7 in that there are 8 stealing bits SB provided on line 146, and there is no requirement for spare bits to be provided.

Referring to FIG. 13(c), the completed RLC/MAC block for the down-link is illustrated, and corresponds to the format shown in FIG. 13(b) with the addition of the 8 stealing bits designated by reference numeral 240. Reference numeral 242 represents the bits of FIG. 13(b).

Four more stealing bits are added to guarantee a complete in-band signal when the second user is absent.

On the up-link or the down-link the 1392 bits of the RLC/MAC block are passed to an 8-PSK modulator of the EDGE encoder. The RLC/MAC speech blocks are preferably interleaved over four bursts, as in the transmission of data packets in EDGE.

At the receiver, the reverse decoding stages are utilised. If the header of a received speech frame is in error, then an error correction is attempted. If the error correction is successful, the received speech frame may still then be discarded if either of the two CRC checks is not successful (the 3 bits protecting the 50 Class Ia bits or the 8 bits CRC protecting the 65 most important Class I bits).

The encoder for generating the RLC/MAC block in the up-link will be very similar to that in the down-link shown in FIG. 12, and is therefore not shown herein. The encoder in the up-link differs in that it is effectively simply half of the encoder shown in FIG. 12. The operation of the encoder in the up-link is best illustrated with reference to FIG. 14

Figure 14A:
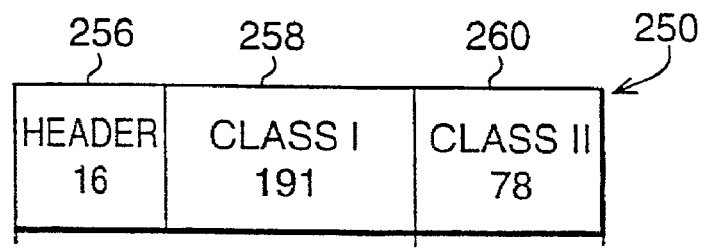
FIGS. 14(a) to 14(c) illustrate an embodiment, corresponding to the embodiment of FIG. 13, for generating an RLC/MAC block in the up-link of an EDGE system.

In the up-link, each user encodes its associated speech frame. Thus FIG. 14(a) illustrates the unencoded speech frame for one of the users, for example the first user. Again, the preferable header format of FIG. 3(b) is used in the up-link. The unencoded speech frame. as shown in FIG. 14(a), comprises a header field 256 comprising the 16 bits of FIG. 12, the 191 Class I bits designated by reference numeral 258, and the 78 Class II bits designated by reference numeral 260.

Figure 14B:
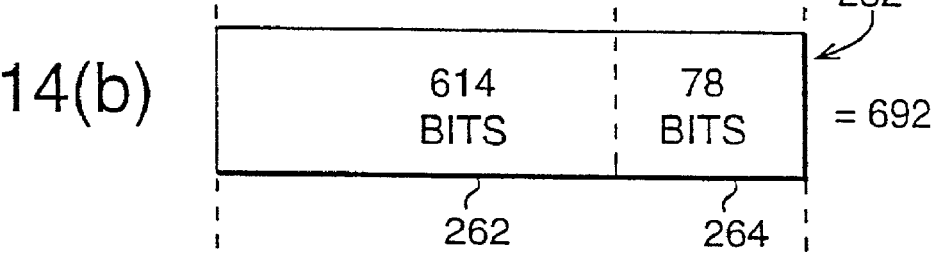

In the up-link, the full 16 bits of the header are convolution encoded with the Class I bits, as discussed hereinabove in the embodiment of two speech frames from the same user. Again, the 3,1,7 convolution code is used, and in the case of the up-link it is necessary to puncture 7 bits. Thus in the up-link the convolution encoder generates 614 bits 262 as shown in FIG. 14(b). In the up-link only 7 bits are punctured.

The puncturing scheme used in a preferable implementation is for Class Ib bits only, and may be expressed as:

$$b(200+j*49) j=0, 1 \ldots 6,$$

where b(i) is the output of the 3,1 encoder. This scheme will not puncture any CRC bits. The CRC bits are located at 151 to 159. Puncturing starts at 200 and finishes at 494.

The 78 Class II bits are included in the encoded speech frame 252 unencoded as before, and are designated by reference numeral 264.

Figure 14C:
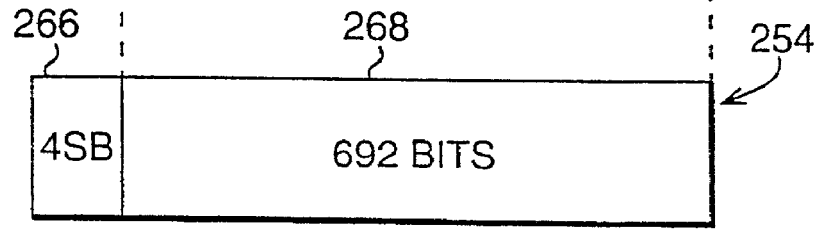

The thus encoded speech frame 252 has four stealing bits 266 added thereto, and this represents half of an RLC/MAC block as shown in FIG. 14(c), where the bits of FIG. 14(b) are represented by reference numeral 268.

Interleaving Scheme

The present description has a particular emphasis on the application of techniques to an EDGE system. In EDGE, it is proposed that data packet encoded into an RLC/MAC block should be transmitted on the down-link or the up-link in four bursts. That is the 1392 bits of an RLC/MAC block should be split into four sections, with each section being sent in a separate burst.

As will be familiar to one skilled in the art, each burst occupies a time slot of a TDMA frame. That is, transmission in a TDMA system takes place in a series of TDMA frames, each of which is split into a number of time slots. Each time slot, in a circuit switched network having dedicated physical channels, is allocated to, and reserved for sole use by, one particular user. Each user then transmits in their time-slot of each TDMA frame, both in the down-link and the up-link.

Referring to FIG. 15(b), there is shown the standard format of a GSM/GPRS burst. The burst 600 comprises a set of 3 tail bits 606 at the front. followed by a set of 58 data bits 608, followed by a set of 26 bits 610 comprising a training sequence, followed by a set of 58 data bits 612, followed by a further 3 tail bits 614 and finally a set of 8.25 bits comprising a guard 616.

Information is transmitted on the physical channel in TDMA time slots, as illustrated in FIG. 15(a). In a TDMA system each TDMA time frame 611 comprises a set of time slots, and in the example of FIG. 15(a) each time frame comprises a set of eight time slots TN1 to TN8. Each time slot TN1 to TN8 of a TDMA frame carries a burst having the format shown in FIG. 15(b). Ordinarily, each time slot within a frame is reserved for use by a particular user.

Referring to FIG. 15(c), the interleaving of a data RLC/MAC block into TDMA frames in a conventional GSM/GPRS system is shown. Block 800 represents the 464 bits of a first RLC/MAC speech block associated with a first user, block 802 represents the 464 bits of a second RLC/MAC block associated with the same first user, and block 804 represents the 464 bits of a third RLC/MAC speech block associated with the same user.

In conventional GSM/GPRS, the 464 bits of a particular block, e.g. the second block 802, are interleaved over eight bursts (in eight TDMA frames) with the least half of the bits from the previous block 800 (designated by reference numeral 801) and the first half of the bits from the next block 804 (designated by reference numeral 805).

Thus, as indicated by the arrows in FIG. 15(c) and as is well understood by one skilled in the art, the first set of 58 bits (including the stealing bits) of the block 802 are interleaved in the third time slot of a first time frame TF1 with the fifth set of 58 bits of the block 800. The second set of 58 bits of the block 802 are interleaved in the third time slot of a second time frame TF2 with the sixth set of 58 bits of the block 800. The third set of 58 bits of the block 802 are interleaved in the third time slot of a third time frame TF3 with the seventh set of 58 bits of the block 800. The fourth set of 58 bits of the block 802 are interleaved in the third time slot of a fourth time frame TF4 with the eighth set of 58 bits of the block 800. The fifth set of 58 bits of the block 802 are interleaved in the third time slot of a fifth time frame TF5 with the first set of 58 bits of the block 804. The sixth set of 58 bits of the block 802 are interleaved in the third time slot of a sixth time frame TF6 with the second set of 58 bits of the block 804. The seventh set of 58 bits of the block 802 are interleaved in the third time slot of a seventh time frame TF7 with the third set of 58 bits of the block 804. The eighth set of 58 bits of the block 802 are interleaved in the third time slot of an eighth time frame TF8 with the fourth set of 58 bits of the block 804. The sets of bits are selected to minimise correlation.

Conversely in the EDGE proposal, each RLC/MAC block is transmitted over four time frames, and hence over four time slots in four successive time frames as illustrated in FIG. 15(d).

FIG. 15(d) represents the arrangement of EDGE when an 8 PSK modulator is used. This allows each conventional burst to accommodate three times the conventional number of bits, i.e. 464 (456 bits plus eight stealing bits). Thus the 1392 bits of an EDGE RLC/LAC block, represented by block 810 in FIG. 15(d), are interleaved over four successive TDMA time frames TF1 to TF4 in the third time slot. Each time slot carries a single burst carrying 348 bits of data.

As can be seen from FIG. 15(d), each burst can carry 348 bits of data, and therefore the 1392 bits of data of the encoded RLC/MAC block can be transmitted over four bursts. However, in the embodiments described herein for the transmission of voice over EDGE the 1392 bits of data may be from two different users, and ordinarily each user would need to be allocated a separate time slot in each time frame.

In order to facilitate a particularly advantageous transmission scheme, there is proposed herein a scheme in which two users share a time slot within a TDMA frame on both the down-link and the up-link. This scheme may be applied advantageously to the transmission of speech frames from two different users over EDGE encoded according to the technique described hereinabove.

According to the new technique proposed herein, the data from each of the two users is transmitted in a common time frame. Referring to FIG. 13(c) it can be seen that the encoded RLC/MAC block comprises 696 bits associated with the first user (including four stealing bits), and 696 bits associated with the second user (including four stealing bits). In accordance with the new technique, in the down-link a quarter of the encoded bits associated with the first user are transmitted in an allocated time slot of each frame on four successive frames, and a quarter of the encoded bits associated with the second user are transmitted in the same allocated time slot of each time frame on the same four successive frames.

Thus, suppose that time slot TN3 is allocated to the two users. In time slot TN3 of time frame TF1 174 bits (including one stealing bit) of the encoded RLC/MAC associated with the first user are transmitted in the data portion 608 of the burst, and 174 bits (including one stealing bit) of the encoded RLC/MAC associated with the second user are transmitted in the data portion 612 of the burst. In time slot TN3 of time frame TF2 a further 174 bits (including one stealing bit) of the encoded RLC/MAC associated with the first user are transmitted in the data portion 608 of the burst, and a further 174 bits (including one stealing bit) of the encoded RLC/MAC associated with the second user are transmitted in the data portion 612 of the burst. This is then repeated for a further two bursts such that all 1392 bits of the burst are transmitted in four successive bursts.

Figure 16:
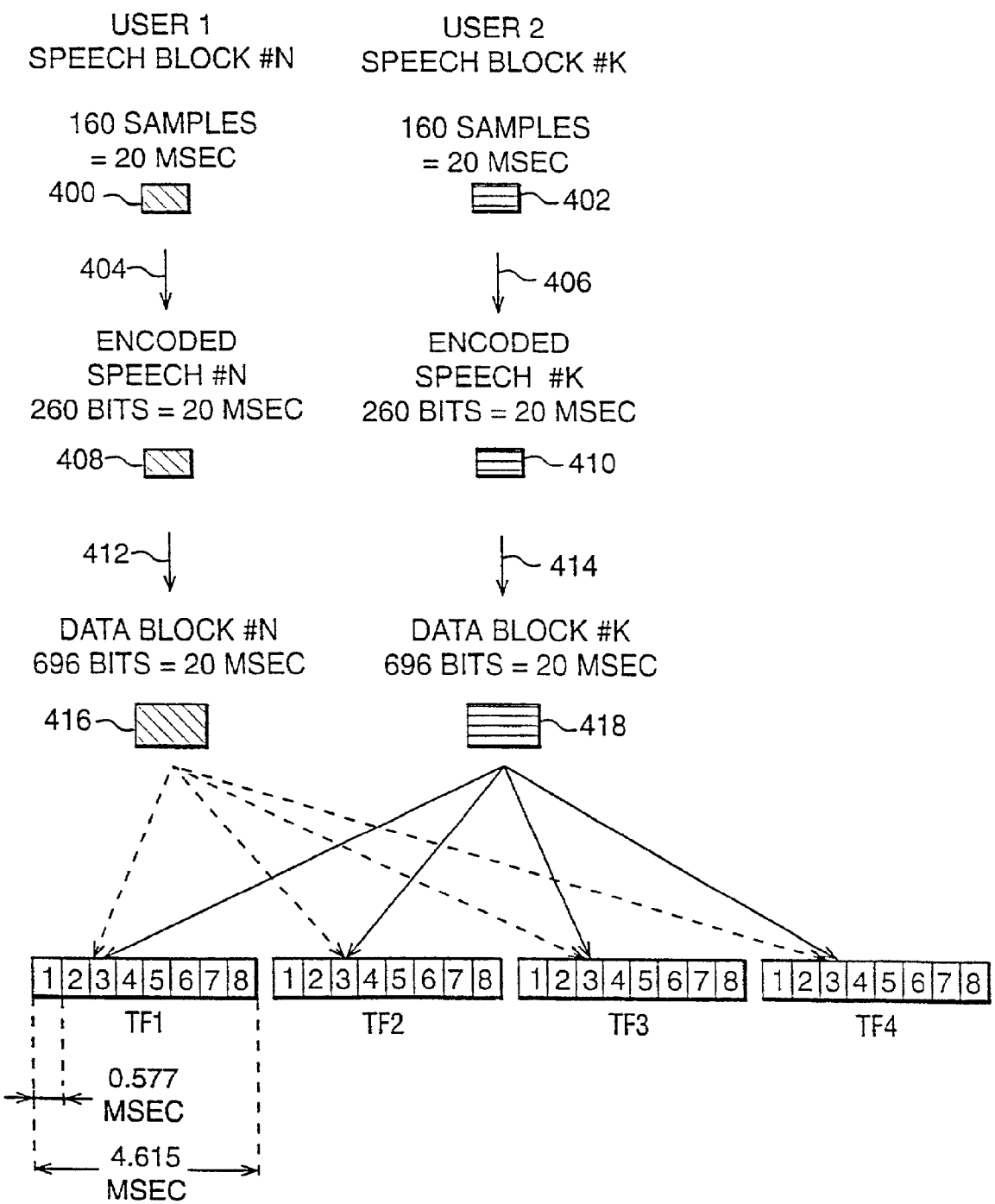
FIG. 16 illustrates a preferable interleaving technique for the down-link of a wireless network.

Referring to FIG. 16, there is further illustrated the principle of such a scheme applied to the down-link, for transmitting the RLC/MAC blocks of FIG. 13(c).

A block designated by reference numeral 400 represents 160 samples of speech associated with a first user in a 20 ms time frame, prior to initial channel encoding. As represented by the arrow 404, these 160 samples are encoded into a 260 bit speech frame for the first user as designated by reference numeral 408, which are the set of bits on the output 108 of the preliminary coding circuit 104. These 260 bits still occupy a 20 ms time period. The 260 bits of the speech frame are then encoded into the 696 bits constituting half of the RLC/MAC block on the output 149 of the output circuit 116, which step is represented by arrow 412. The 696 bits of the RLC/MAC block are designated by reference numeral 416.

Similarly, for the second user, the arrows 406, 410 and 414 correspond directly to the functions illustrated by the arrows 400, 408 and 416 respectively. The blocks designated 402, 410, and 414 for the second user correspond directly to the blocks 404, 412 and 416 for the first user.

Thus the block 418 corresponds to the set of 696 bits of the RLC/MAC block of FIG. 13(c) associated with the second user.

The third time slot of the TDMA frames is allocated to both users. In a first frame TF1 a first quarter of the encoded data for each user plus two respective steering bits is transmitted. In a second frame TF2 a second quarter of the encoded data for each user plus two respective stealing bits is transmitted. In a third frame TF3 a third quarter of the encoded data for each user plus two respective stealing bits is transmitted. In a fourth frame TF4 a fourth quarter of the encoded data for each user plus two respective steering bits is transmitted. Thus the whole RLC/MAC block is transmitted over four bursts or time slots.

In a preferred implementation, the coded bits are reordered and interleaved according to the following rule:

$$i(B,j)=c(n,k)$$

for: $k=0, 1, \ldots, 691$ $n=0, 1, \ldots, N, N+1, \ldots$ where n is the frame number.

The result of the interleaving is a distribution of the reordered 692 bits of a given user one speech block, n=N, over 4 blocks using the even numbered bits of the first 2 blocks (B=B0+2N+0,1) and the odd numbered bits of the last 2 blocks (B=B0+2N+2,3). The reordered bits of the second user speech block, n=K, use the odd numbered bits of the first 2 blocks (B=B0+2N+0,1) and the even numbered bits of the last 2 blocks (B=B0+2N+2,3).

The mapping is given by the rule:

$$e(B,j)=i(B,j) \text{ and } e(B,176+j)=i(B,174+j) \text{ for } j=0, 1, \ldots, 173$$

and $$e(B,174)=SB(2B) \text{ and } e(B,175)=SB(2B+1)$$

The two bits, labeled SB(2B) and SB(2B+1) on burst number B are flags used for indication of control channel signaling.

In the up-link, the technique proposed with reference to FIG. 16 is not feasible, since neither user is synchronised with the other. However an adaptation of the technique is still possible, which still employs the concept of the two users sharing the same time slot to transmit the 1392 bits of the RLC/MAC block over four successive bursts.

Again, suppose that time slot TN3 is allocated to the two users. In time slot TN3 of time frame TF1 174 bits (including one stealing bit) of the encoded RLC/MAC associated with the first user are transmitted in the data portion 608 of the burst, and a further 174 bits (including one stealing bit) of the encoded RLC/MAC associated with the second user are transmitted in the data portion 612 of the burst. In time slot T3 of time frame TF2 174 bits (including one stealing bits) of the encoded RLC/MAC associated with the second user are transmitted in the data portion 608 of the burst, and a further 174 bits (including one stealing bit) of the encoded RLC/MAC associated with the second user are transmitted in the data portion 612 of the burst. The remaining bits associated with the first user are then transmitted in the third time frame TF3, and the remaining bits associated with the second user are then transmitted in the fourth time frame.

Figure 17:
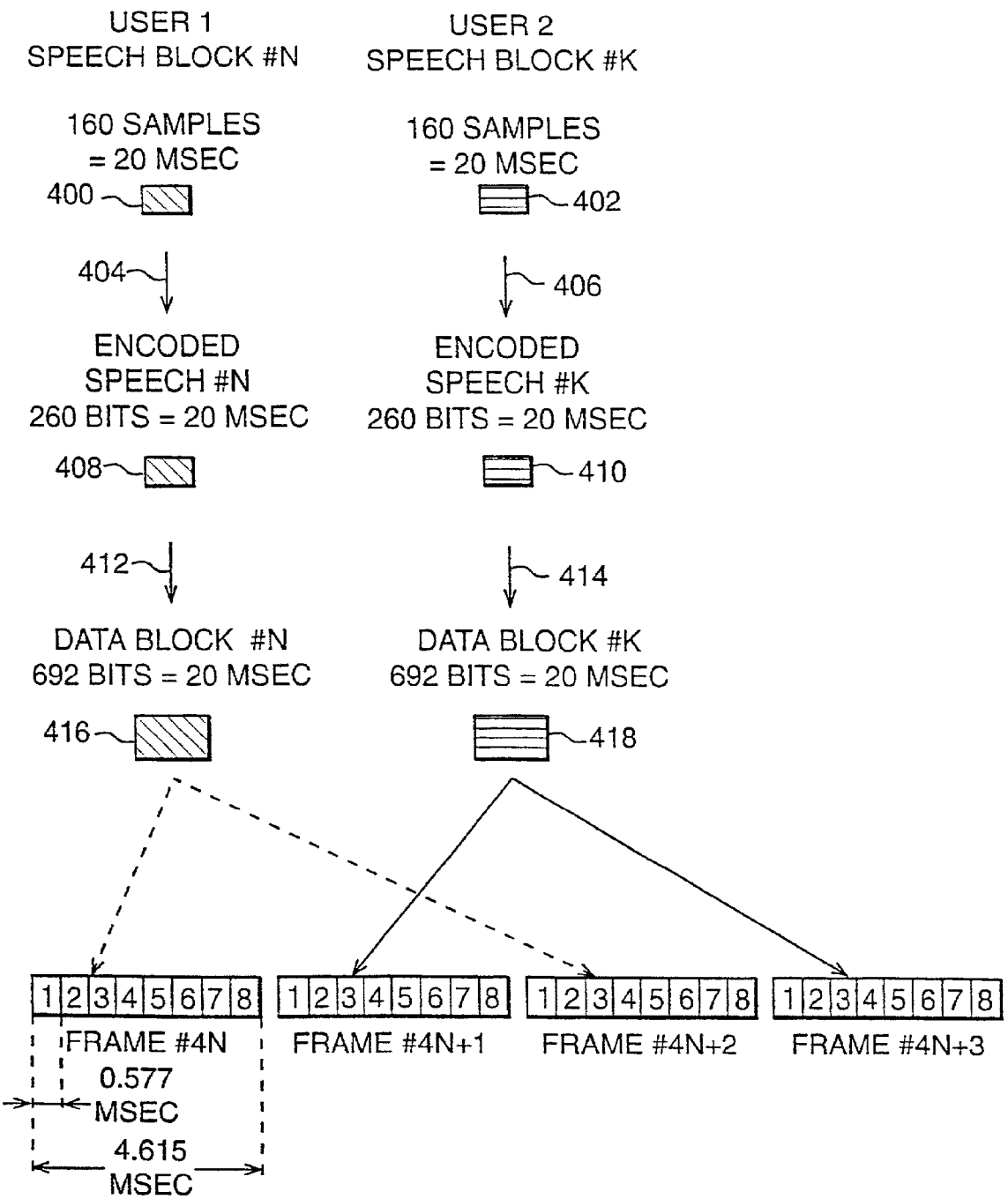
FIG. 17 illustrates a preferable interleaving technique for the up-link of a wireless network.

Referring to FIG. 17, there is further illustrated the principle of such a scheme applied to the up-link, for transmitting the RLC/MAC blocks of FIG. 13(c).

The blocks 400, 408, and 416 in FIG. 17 correspond to the same blocks as like reference numerals in FIG. 16, and are associated with the first user. The blocks 402, 410, and 418 in FIG. 17 similarly refer to the same blocks as like reference numerals in FIG. 16, and are associated with the second user.

The 696 bits of the RLC/MAC block for the first user are designated by reference numeral 416, and the 696 bits of the RLC/MAC block for the second user are designated by reference numeral 418.

Similarly, for the second user, the arrows 406, 410 and 414 correspond directly to the functions illustrated by the arrows 400, 408 and 416 respectively. The blocks designated 402, 410, and 414 for the second user correspond directly to the blocks 404, 412 and 416 for the first user.

The 696 bits of the encoded RLC/MAC block are interleaved over two even/odd bursts and passed to the 8-PSK modulator.

In the up-link, the coded bits are preferably reordered and interleaved according to the following rule:

$$i(B,j)=c(n,k) \text{ for } k=0, 1, \ldots, 691$$

$$n=0, 1, \ldots, N, N+1, \ldots$$

The result of the interleaving is a distribution of the reordered 692 bits of the user one speech block, n=N, over 2 even blocks (B=B0+2N+0,2) and the reordered bits of the user two speech block, n=K, use odd blocks (B=B0+2N+1, 3).

The mapping is given by the rule:

$$e(B,j)=i(B,j) \text{ and } e(B,176+j)=i(B,174+j) \text{ for } j=0, 1, \ldots, 173$$

and $$e(B,174)=SB(2B) \text{ and } e(B,175)=SB(2B+1)$$

The two bits, labeled SB(2B) and SB(2B+1) on burst number B are flags used for indication of control channel signaling.

Figure 18:
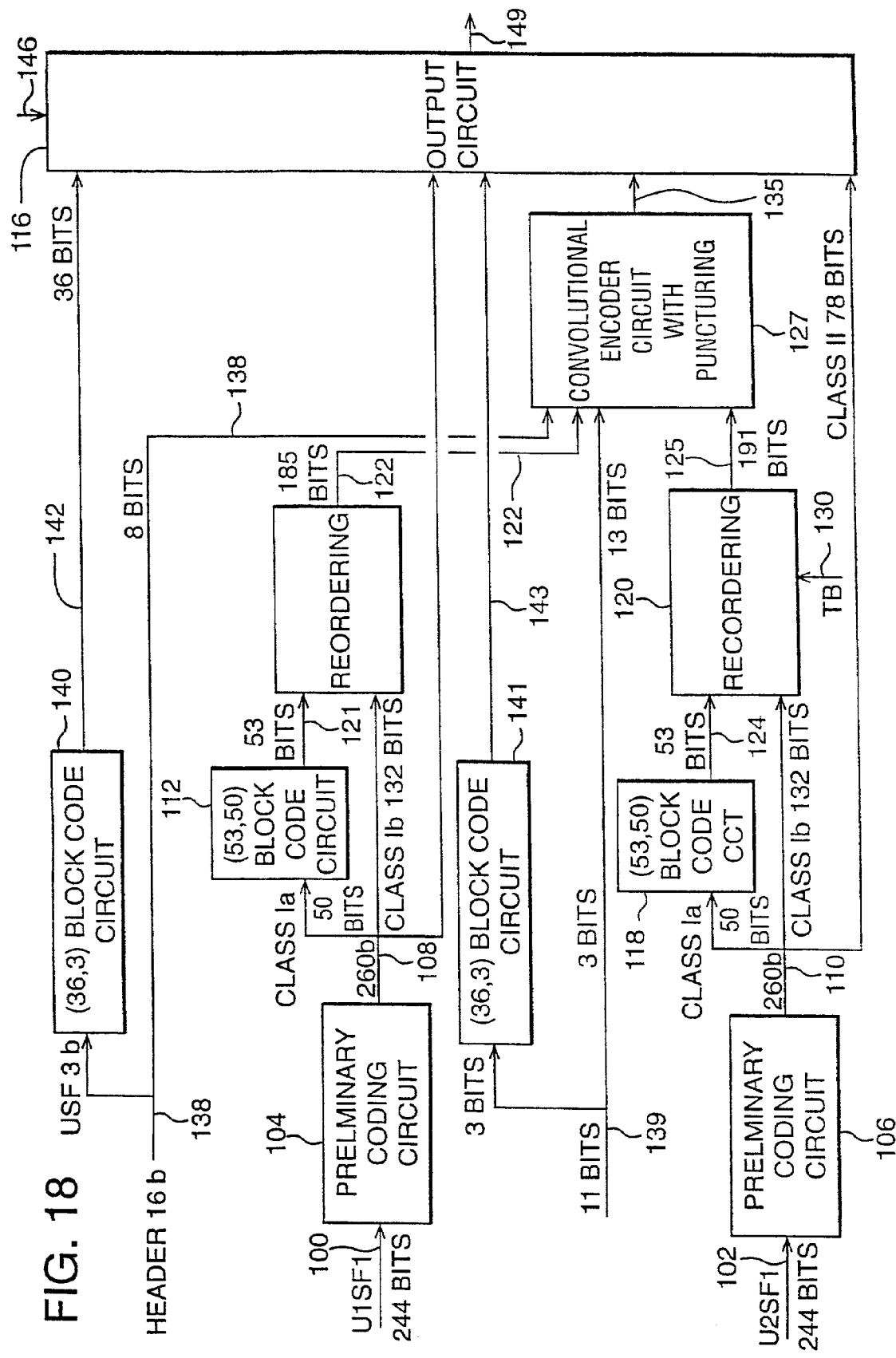
FIG. 18 illustrates circuitry for generating an RLC/MAC block in the down-link of an EDGE system.

Two Speech Frames from Different User—Case II Referring to FIG. 18, there is shown a block diagram illustrating a second embodiment for encoding two speech frames from two different users in the down-link of a packet switched network. The down-link encoder of FIG. 18 corresponds substantially to the down-link encoder of FIG. 12, and like reference numerals have been used to denote like elements. The main difference lies in the combining of the convolution encoder circuits with puncturing 126 and 128 into a single convolution encoder circuit with puncturing 127.

In this embodiment, the header for the down-link shown in FIG. 1(a) is used.

The 244 bits of the first speech frame U1SF1 from the first user are received on the signal line 100, and the 244 bits of the first speech frame U2SF1 from the second user are received on the signal line 102. Each of the 244 bit speech frames U1SF1 and U2SF1 are processed by the preliminary coding circuits 104 and 106, and the block code circuits 112 and 118 exactly as described hereinabove with reference to FIGS. 7 and 12.

The reordering circuit 120 processes the 53 Class Ia bits on line 124 and the 132 Class II bits on line 110 in exactly the same manner as described hereinabove with reference to FIGS. 7 and 12. Thus the reordering circuit 120 generates the reordered 191 bits, including the 6 tail bits supplied on the tail bit input TB on line 130.

The reordering circuit 114, however, is modified relative to the re-ordering circuit 114 of FIGS. 7 and 12. The reordering circuit 114 of FIG. 18 does not receive any tail bits, and thus the 185 bits at its input are presented on its output line 122. The reason why the tail bits are not provided to the reordering block 114 are most easily understood with reference to FIG. 19.

Figure 19:
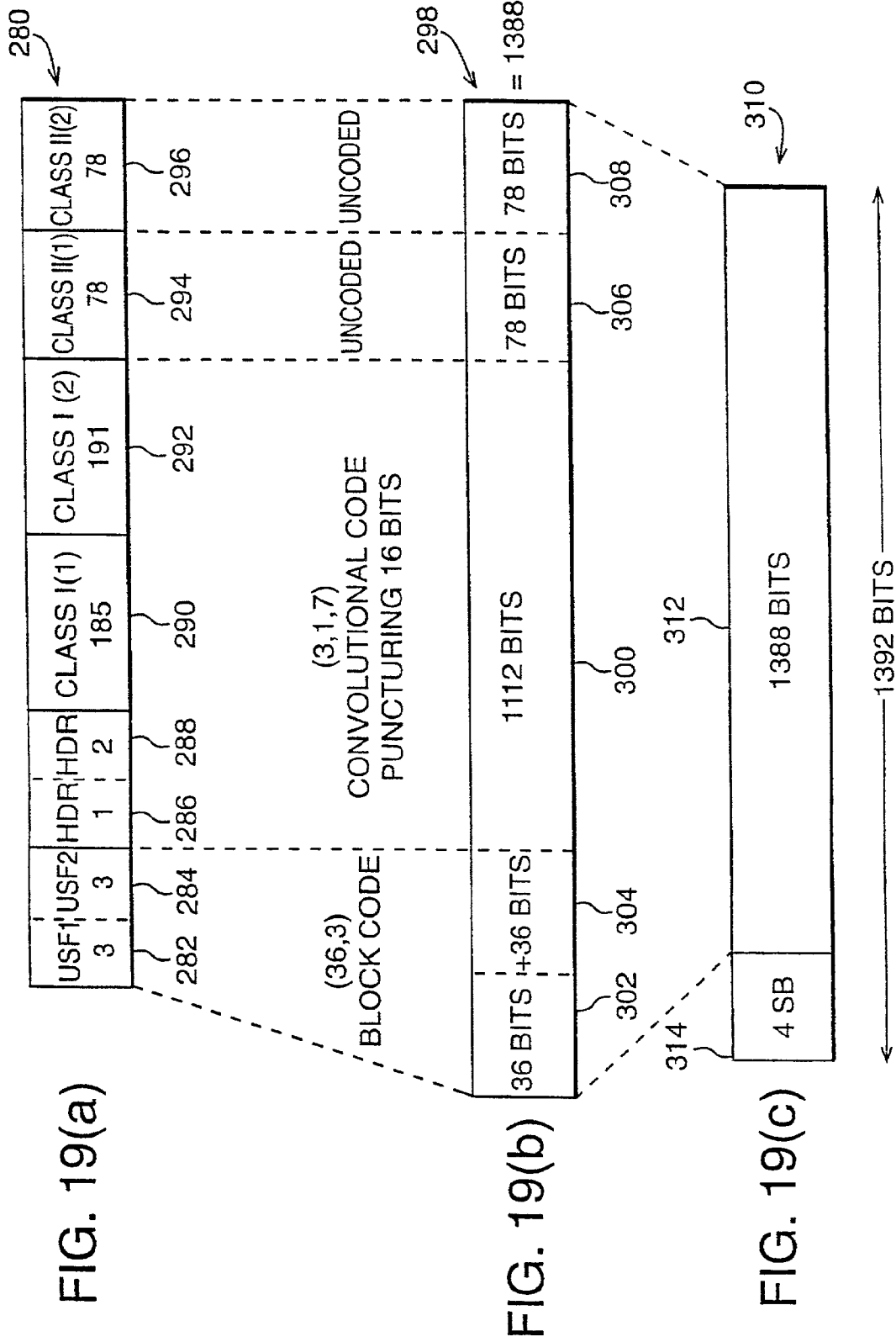
FIGS. 19(a) to 19(c) illustrate one embodiment of the generation of an RLC/MAC block from two speech frames from the same users in the down-link of an EDGE network utilising the circuit of FIG. 18.

FIG. 19(*a*) illustrates the format of the two speech frames, and their associated headers, prior to encoding into the format for the RLC/MAC block.

The 3 bits of the USF field from the first user's header on line 138 are designated by reference numeral 282. The 3 bits of the USF field from the second user's header on line 139 are designated by reference numeral 284. The remaining 8 bits of the first user's header on line 138 are designated by reference numeral 286, and the remaining 8 bits of the second user's header on line 138 are designated by reference numeral 288. The 185 Class I bits from the first user on line 122 are designated by reference numeral 290, and the 191 Class I bits from the second user on line 125 are designated by reference numeral 292. The 78 Class II bits from the first user on line 108 are designated by reference numeral 294, and the 78 Class II bits from the second user on line 110 are designated by reference numeral 296.

It can be seen from studying FIG. 19(*a*), and comparing it to FIG. 13(*a*), that the fields in the unencoded block of FIG. 19(*a*) have been rearranged such that equivalent fields from each user are adjacent. This introduces an advantage by the location of the two Class I fields of each block adjacent each other. As discussed hereinabove, the six tail bits are introduced into the Class I bits as a tail to terminate the convolution encoder. By placing the two sets of Class I bits together, and encoding them together, the set of tail bits for one set of Class I bits can be removed. Thus the set of tail bits associated with the first user is eliminated, and hence the reordering circuit 114 only needs to generate 185 bits, and does not need to include any tail bits.

This saving of bits results in the more efficient implementation of the convolution code. The combined convolution encoder circuit with puncturing encodes the two remaining sets of 8 bits of each header and the two sets of Class I bits into a set of 1112 bits by utilising the 3,1,7 convolution code as discussed above. The convolution encoder with puncturing punctures 16 bits. The encoded speech frames are illustrated in FIG. 19(*b*). The 1112 convolution encoded bits are designated by reference numeral 300.

The puncturing scheme is applied for Class Ib bits only and the preferable scheme is represented by:

b(200+j*49) j=0, 1 ... 7, where b(i) is the output of the 3,1,7 encoder.

b(755+j*49) j=8, ... 15, where b(i) is the output of the 3,1,7 encoder.

The total number of bits reduces from 1128 to 1112.

As described before with reference to FIG. 12, each of the 3 bit USF fields are encoded in the block code circuits 140 and 141 into a respective set of 36 bits, using the block code described hereinabove. The 36 bits corresponding to the first user are designated by reference numeral 302 and the 36 bits corresponding to the second user are designated by reference numeral 304.

Each set of 78 Class II bits are unencoded as before, and are designated by the reference numerals 306 and 308.

Referring to FIG. 19(*c*), there is shown the final encoded RLC/MAC block 310, which comprises the 1388 bits from FIG. 19(*b*) designated by reference numeral 312, together with 4 stealing bits designated by reference numeral 314.

The down-link, in this embodiment, utilises the interleaving technique introduced in FIG. 16 for interleaving the RLC/MAC blocks onto four bursts.

For this particular embodiment, there are two alternative techniques discussed hereinbelow for encoding on the up-link. As discussed hereinabove for the first embodiment of two speech frames from different users on the up-link, neither user has any information about the other, and therefore each speech frame from each user is encoded separately.

Figure 20:
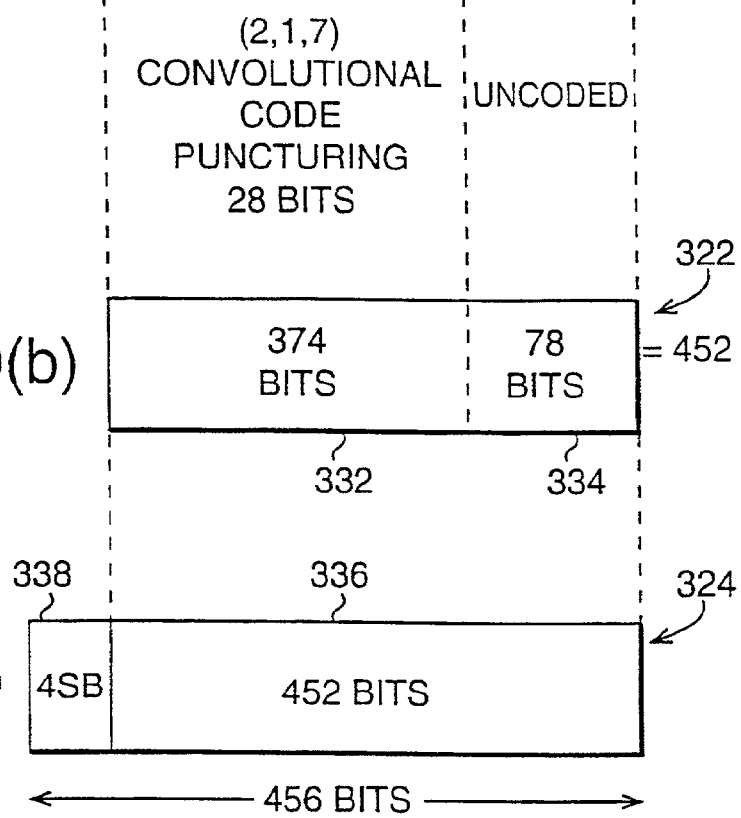
FIGS. 20(a) to 20(c) illustrate an embodiment, corresponding to the embodiment of FIG. 19, for generating an RLC/MAC block in the up-link of an EDGE system.

FIG. 20 shows a first example of up-link coding. In FIG. 20(*a*) there is shown an unencoded speech block 322 having a header designated by reference numeral 326 corresponding to that of FIG. 1(*b*), a set of 191 Class I bits designated by reference numeral 328, and a set of 78 Class II bits designated by reference numeral 330.

The encoded speech block 322 is illustrated in FIG. 20(*b*). In this example, the up-link header and the set of Class I bits are encoded together by a 2,1,7 convolution code, with puncturing of 28 bits.

The preferable puncturing scheme applied for Class Ib bits only is:

b(110+j*10) j=0,1 ... 27, where b(i) is the output of the ½ encoder. The total number of bits reduces from 402 to 374.

This results in a set of 374 bits as designated by reference numeral 332. As before the 78 Class II bits remain unencoded, and are designated by reference numeral 334.

Finally, the RLC/MAC block 324 for transmission is illustrated in FIG. 20(*c*), and includes all the bits of FIG. 20(*b*) designated by reference numeral 336 together with the 4 stealing bits designated by reference numeral 328.

The speech frame of the second user is similarly encoded, and results in an RLC/MAC block with the identical format to that of FIG. 20(*c*).

New Burst Structure

Figure 21:
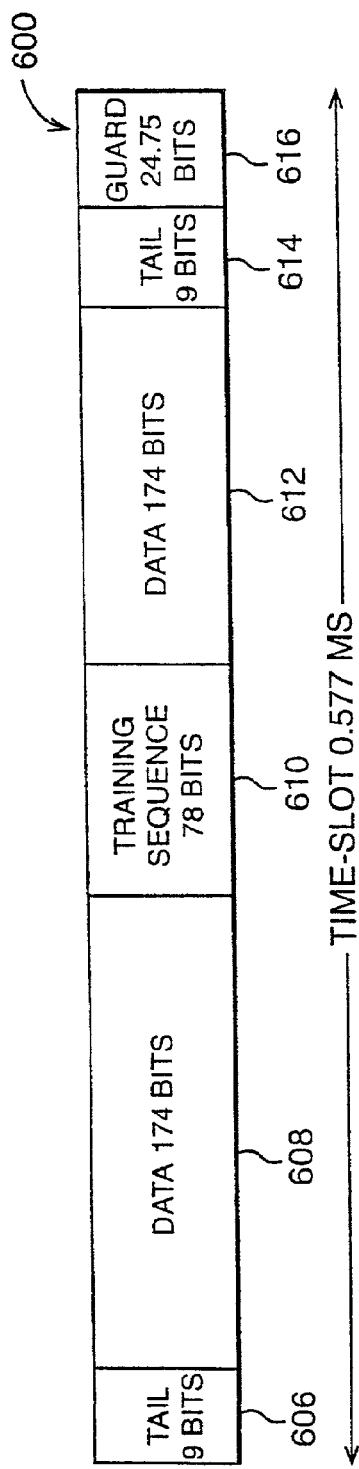
FIG. 21 illustrates a convnetional GSM/GPRS burst structure.

FIG. 21 illustrates the conventional structure of a normal burst, and is identical to that shown and described previously with reference to FIG. 15(*b*). However, in FIG. 21 the number of bits in each portion of the burst corresponds to those which can be accommodated using 8 PSK modulation.

Figure 22:
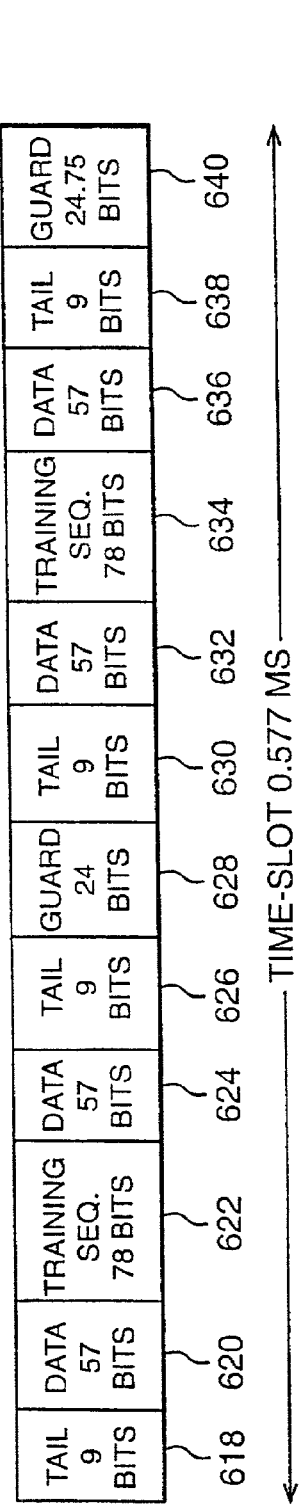
FIG. 22 illustrates one embodiment of a preferable burst structure.

In the following a new burst structure based on the GSM/GPRS burst structure is proposed, which advantageously utilises the encoding technique for the up-link described with reference to FIG. 20. Referring to FIG. 22 there is shown a new burst structure 602, equivalent in length to the burst structure of FIG. 21. but having tail portions 618, 626, 630 and 638, data portions 620, 624, 632, and 636, training sequences 622 and 634, and guard portions 628 and 640. The 456 bits of an encoded RLC/MAC block are interleaved over four half bursts and passed to the 8 PSK modulator.

FIG. 23 shows a second example of up-link coding. In FIG. 23(*a*) there is shown the unencoded speech block 320 of FIG. 20(*a*).

The encoded speech block 340 is illustrated in FIG. 23(b). In this example, the up-link header and the set of Class I bits are encoded together by a 3,1,7 convolution code, with puncturing of 181 bits.

This scheme uses (3,1,7) convolutional code rather than (2,1,7) convolutional code in previous section. This code has better coding gain but it produces more bits and lot puncturing has to be done.

Puncturing schemes are used:

b(43+j*3) j=0, 1 . . . 44, where b(i) is the output of the ⅓ encoder.

b(193+j*3) j=0, 1 . . . 135, where b(i) is the output of the ⅓ encoder.

This scheme will not puncture any header or CRC bits. The header is located at bits 1 to 30 and the CRC is located at bits 181 to 189.

This results in a set of 422 bits as designated by reference numeral 342. As before the 78 Class II bits remain unencoded, and are designated by reference numeral 344.

Finally, the RLC/MAC block 350 for transmission is illustrated in FIG. 23(c), and includes all the bits of FIG. 23(b) designated by reference numeral 348 together with the 4 stealing bits designated by reference numeral 346.

The speech frame of the second user is similarly encoded, and results in an RLC/MAC block with the identical format to that of FIG. 23(c).

Figure 24:
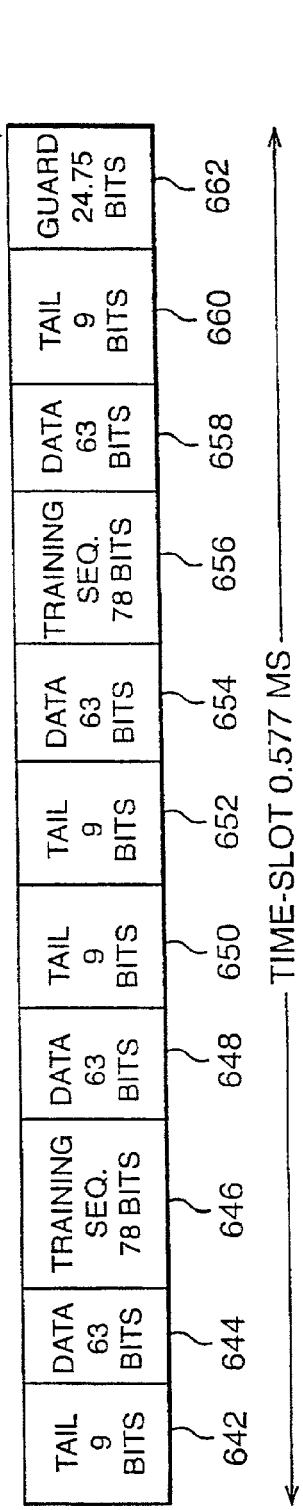
FIG. 24 illustrates another embodiment of a preferable burst structure.

Referring to FIG. 24 there is shown a further adaptation of the new burst structure 604 of FIG. 22, again equivalent in length to the burst structure of FIG. 21, but having tail portions 642, 650, 652 and 660, data portions 644, 648, 654, and 658, and training sequences 646 and 656. Thus the new burst structure of FIG. 24 corresponds to the new burst structure of FIG. 22, but without any guard bands. The 504 bits of the encoded RLC/MAC block in FIG. 23 are interleaved over four half bursts and passed to the 8 PSK modulator.

Figure 25:
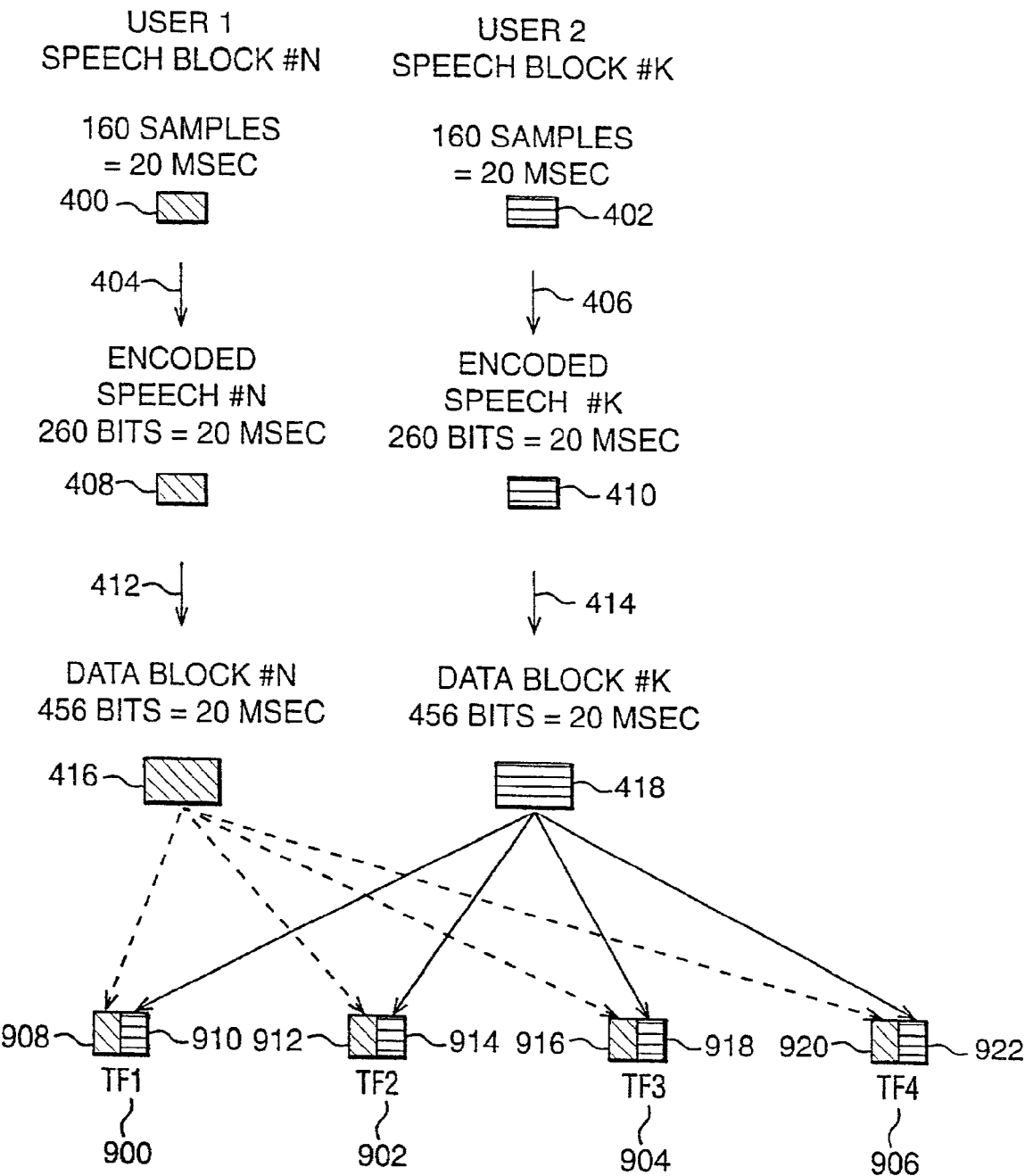
FIG. 25 illustrates an example implementation of the preferable burst structures of FIGS. 22 and 24.

Referring to FIG. 25, there is illustrated an example of the encoding technique described above with reference to FIG. 20, and the interleaving of the encoded RLC/MAC blocks into the new burst structure. The blocks 400, 408, and 416 in FIG. 25 correspond to the same blocks as like reference numerals in FIG. 17, and are associated with the first user. The blocks 402, 410, and 418 in FIG. 25 similarly refer to the same blocks as like reference numerals in FIG. 17, and are associated with the second user. In this example each of the blocks 416 and 418 comprises 456 bits corresponding to the 456 bits of FIG. 20(c) for each of the first and second users.

As illustrated in FIG. 25, each time frame includes a time-slot, which is assumed to be the third time slot TN3, which is partitioned into two time slots. Thus in a first time frame TF1 the third time slot 900 is divided into a first sub-time-slot 908 and a second sub-time-slot 910. In a second time frame TF2 the third time slot 902 is divided into a first sub-time-slot 912 and a second sub-time-slot 914. In a third time frame TF3 the third time slot 904 is divided into a first sub-time-slot 916 and a second sub-time-slot 918. In a fourth time frame TF4 the third time slot 906 is divided into a first sub-time-slot 920 and a second sub-time-slot 922. The other time-slots of each time frame are not shown for reasons of clarity in the Figure.

Thus, in accordance with this technique, a quarter of the 456 bits associated with the first user and represented by block 416 are transmitted in each of the four sub-time-slots 908, 912, 916, and 920. A quarter of the 456 bits associated with the second user and represented by block 418 are transmitted in each of the four sub-time-slots 910, 914, 918, and 922. The burst structure in each sub-time-slot corresponds to that of FIG. 22.

In this way each physical channel formed by a conventional time slot becomes two physical channels. In this way an eight physical channel system may become a sixteen physical channel system.

Thus the original burst can be treated as two separate bursts. The information of a first user will occupy the first new burst (the top half of the original burst), and the information of the second user will occupy the second new burst (the bottom half of the original burst). Interleaving may be done by the conventional GSM/GPRS method, but with a new size of 456 for the burst structure of FIG. 22, and a new size of 504 for the burst structure in FIG. 24.

The partitioning of each time slot into a greater number of sub-time-slots is possible. Thus, in general, if a time slot normally supports a burst structure having n bits, each time slot may be partitioned into m sub-time-slots, bits being transmitted in each sub-time-slot in a corresponding burst structure having n/m bits.

In the general case, data from p users may be encoded such that each forms 1/p bits of an RLC/MAC block, wherein the encoded data is encoded into one of a p sub-time-slots.

Using the coding technique of FIG. 20, the burst structure of FIG. 24 may be similarly utilised in a system such as FIG. 24. The guard band of the structure of FIG. 22 may be eliminated where there is good synchronisation between the users.

Thus in a circuit or packet switched TDMA network, the number of physical channels may be doubled or further increased.

The interleaving technique for transmitting user data from different users in the same time slot, described hereinabove with reference to, for example, FIGS. 16 and 17 may be combined with the technique described hereinabove with reference to, for example, FIG. 25, for partitioning a time-slot. In this way sub-time-slots may be partitioned.

Four Speech Frames from Different Users

A further embodiment is now described in which four speech frames all associated with different users are encoded into a single RLC/MAC block for transmission over EDGE. In this embodiment a standard GSM Half-rate encoder is utilised.

A standard GSM half-rate speech encoder generates a speech frame having 112 bits. 95 of these bits are Class I bits, of which 22 are Class Ia and 73 are Class Ib. The remaining 17 bits are Class II bits.

The ordering of the bits of a half-rate speech frame is shown in FIG. 10(a).

As can be seen, the speech frame 700 comprises the 73 Class Ib bits 702, followed by the 22 Class Ia bits 704, and followed by the 17 Class II bits 706.

In standard GSM, the Class Ia bits of the half-rate encoded speech frame 700 of FIG. 10(a) are protected by three parity bits used for error detection. After addition of the three parity bits, a 115 bit half-rate encoded speech frame 708 is formed having the format shown in FIG. 10(b). The three parity bits 710 are positioned between the Class Ia bits 704 and the Class II bits 706.

The circuitry for generating the half-rate encoded speech frame 708 of FIG. 10(b) may be a standard GSM speech encoder, the implementation of which will be well within the scope of one skilled in the art. The circuitry for further encoding such speech frames into an EDGE RLC/MAC block will also be apparent to one skilled in the art having reference to the circuit of FIG. 7 described hereinabove and the following additional description. For reasons of conciseness, a further modified implementation of such a circuit is not shown here. The necessary modifications to the circuit of FIG. 7 will be apparent from the following description with further reference to FIGS. 10 and 11.

The encoding of the half-rate speech frame up to now is in conformance with speech encoding used in GSM. In this example the advantageous header structure for the down-link of FIG. 3(a) is again utilised.

Referring to FIG. 10(b), there is shown one unencoded down-link speech frame 712 associated with one user. The 3 bits of the USF field of the header on line 138 are designated by numeral 720, the remaining 13 bits of the header are designated by reference numeral 722.

The three USF bits of the down-link header are block coded into 36 bits as designated by reference numeral 726 in FIG. 10(d). For the encoding of the USF field in the header the 36,3 linear block code as suggested for EDGE data transmission and shown hereinabove in Table I is used.

The 95 Class I bits 702 and 704 of the first speech frame are combined with the remaining 13 bits of the header 722 (i.e. all fields except the 3 USF bits) and the 3 CRC bits 710 in a convolutional encoder circuit. A 3,1,7 convolutional code is utilised as described above to generate 351 bits designated by reference numeral 724 in FIG. 10(c).

The 3,1,7 convolutional code described hereinabove with reference to FIG. 7 is again used, having the generator polynomials of the rate 3,1,7 convolutional code as follows:

$G_0(D)=1+D^2+D^3+D^5+D^6$ $G_1(D)=1+D+D^2+D^3+D^4+D^6$ $G_2(D)=1+D+D^4+D^6$

The output of the convolutional encoder comprises 351 bits [b(1), . . . , b(351)]. In order to fulfil the length requirements of the EDGE RLC/MAC block, puncturing must be used at this stage. More specifically, 58 of the 351 bits 724 are punctured to result in a set of 293 encoded bits designated by reference numeral 728 in FIG. 10(d). The punctured bits are the following:

$b(40+5 \cdot i)=0, i=0,1, \ldots, 56$ $b(324)=0$

Careful examination of the punctured bits shows that none of the critical CRC and header bits are punctured.

The 17 Class II bits are unencoded and are designated by reference numeral 730 in FIG. 10(d).

Referring to FIG. 10(e), the completed RLC/MAC block 742 for the down-link is illustrated, and corresponds to the format shown in FIG. 10(d) with the addition of 8 stealing bits designated by reference numeral 734 and encoded second, third, and fourth speech frames designated 736, 738, and 740.

Each of the second, third, and fourth half-encoded speech frames from the same user are encoded in an identical manner to that described in relation to the first speech frame with reference to FIGS. 10(a) to 10(d). In this embodiment all speech frames are encoded with their headers-, since with the technique used—puncturing 58 bits per frame—this results in a length of bits (with the 8 stealing bits) equivalent in length to an EDGE RLC/MAC block.

At the receiver end, prior to decoding, the punctured bits are replaced with zeros. The punctured block consists of 293 bits, which are combined with the 36 encoded USF bits and the 17 uncoded Class II bits to form the first block of the transmitted RLC/MAC block. The same procedure is followed for the rest three speech frames. At the end 8 stealing bits are inserted. After the RLC/MAC block is formed, it is forwarded to the modulator and interleaver. Interleaving over four bursts is preferably used in the downlink as in EDGE data transmission.

Because all the headers are encoded, this same technique may be used for encoding four speech frames which are not all associated with the same user.

Whilst the above description has been in relation to the transmission of four speech frames in the same RLC/MAC block in the down-link, and FIG. 8 represents a summary of the channel coding for transmission of four speech frames in one RLC/MAC block for down-link transmission, similar techniques apply in the up-link. FIG. 11 illustrates the channel coding principle applied for transmission of four speech frames in one RLC/MAC block for up-link transmission.

Referring to FIG. 11(b), there is again shown one unencoded down-link speech frame 713 associated with one user. The 16 bit header is designated by numeral 723.

The 95 Class I bits 702 and 704 of the first speech frame are combined with the 16 bits of the header 723 and the 3 CRC bits 710 in a convolutional encoder circuit. A 3,1,7 convolution code is again utilised to generate 360 bits (including 6 tail bits) designated by reference numeral 750 in FIG. 11(c).

The output of the convolutional encoder comprises 360 bits [b(1), . . . , b(360)]. In order to fulfil the length requirements of the EDGE RLC/MAC block, puncturing must again be used at this stage. 31 of the 360 bits 750 are punctured to result in a set of 329 encoded bits designated by reference numeral 756 in FIG. 10(d). The punctured bits are the following:

$b(53+9 \cdot i)=0, i=0, 1, \ldots, 29$ $b(324)=0$

The 17 Class II bits 706 are unencoded. The encoded frame 752 is then allocated two stealing bits 766 and multiplexed into an RLC/MAC block with the three other frames. Each of the three other encoded frames 760, 762, and 764 is associated with two stealing bits 768, 770, and 772 respectively.

As will be discussed later herein, if four encoded speech frames are from different users, in a preferable embodiment they may share a common TDMA time slot.

Each encoded frame is preferably transmitted in one burst. Since four different blocks may come from four different users in the uplink, it is not possible to interleave the RLC/MAC block over four bursts. Alternatively block interleaving is used for each block in each burst. Specifically, the 346 bits are inserted in a 18×20 rectangular matrix column by column. This matrix has 360 elements and therefore the last 14 elements are empty. The bits are read out row by row. This interleaving scheme achieves a minimum distance of 18 between consecutive bits. At the receiver end the inverse procedure (de-interleaving) is followed.

The invention claimed is:

1. A method of encoding at least two sets of data bits into a single encoded block, wherein each set of data bits includes a primary set of bits to be encoded and a secondary set of bits to remain unencoded, wherein the encoding technique requires a set of code terminating bits to be added to the primary set of bits, the method comprising: combining the two sets of primary bits; and encoding the combined two sets of primary bits, whereby one set of code terminating bits is added to the combined two sets of primary bits, wherein the data bits are for transmission on an EDGE packet switched network, wherein the at least two sets of data bits are encoded into a single RLC/MAC block.

2. The method of claim 1, wherein the two sets of data bits each include a header portion and a payload portion, the payload portion comprising encoded speech.

3. The method of claim 1 wherein the encoding step is a channel encoding step for encoding the at least two sets of data bits for transmission on a packet switched network.

4. An encoder for encoding at least two sets of data bits into a single encoded block, each set of data bits including a primary set of bits to be encoded and a secondary set of bits to remain unencoded, wherein the encoding technique requires a set of code terminating bits to be added to each primary set of bits, the encoder comprising: input means for receiving the primary set of bits from each set of data bits and combining them;

encoding means for encoding the combined primary set of bits from each set of data bits; and output means for adding a single set of code terminating bits to the combined encoded primary sets of bits, wherein at least two sets of data bits each include a header portion and a payload portion, the payload portion including encoded speech and the single encoded block being an RLC/MAC block.

5. A packet switched network including the encoder of claim 4.

* * * * *